United States Patent
Spring et al.

(10) Patent No.: US 7,349,923 B2
(45) Date of Patent: Mar. 25, 2008

(54) SUPPORT APPLICATIONS FOR RICH MEDIA PUBLISHING

(75) Inventors: Leslie Spring, Granada Hills, CA (US); Todd Hollenbeck, Hermosa Beach, CA (US); James Andreas Hjelming, Santa Monica, CA (US); Galvin Karan Hsiu, Los Angeles, CA (US); Jose Armando Pena, Duarte, CA (US); Omar Hamoui, Culver City, CA (US)

(73) Assignees: Sony Corporation, Tokyo (JP); Sony Pictures Entertainment Inc., Culvery City, CA (US)

( * ) Notice: Subject to any disclaimer, the term of this patent is extended or adjusted under 35 U.S.C. 154(b) by 196 days.

(21) Appl. No.: 10/813,874

(22) Filed: Mar. 30, 2004

(65) Prior Publication Data

US 2005/0102324 A1 May 12, 2005

Related U.S. Application Data

(60) Provisional application No. 60/466,431, filed on Apr. 28, 2003.

(51) Int. Cl.
*G06F 7/00* (2006.01)
(52) U.S. Cl. .......................... 707/104.1; 707/3; 341/50
(58) Field of Classification Search ............... None
See application file for complete search history.

(56) References Cited

U.S. PATENT DOCUMENTS

| | | | |
|---|---|---|---|
| 5,270,922 | A | 12/1993 | Higgins |
| 6,460,043 | B1 | 10/2002 | Tabbara et al. |
| 2002/0010679 | A1 | 1/2002 | Felsher |
| 2002/0010798 | A1 | 1/2002 | Ben-Shaul et al. |
| 2002/0019827 | A1 | 2/2002 | Shiman et al. |
| 2002/0194195 | A1 * | 12/2002 | Fenton et al. ............ 707/104.1 |
| 2003/0014421 | A1 | 1/2003 | Jung |
| 2004/0032348 | A1 * | 2/2004 | Lai et al. ....................... 341/50 |
| 2004/0093377 | A1 | 5/2004 | Lumera et al. |
| 2004/0215725 | A1 | 10/2004 | Love et al. |
| 2004/0230636 | A1 | 11/2004 | Masuoka et al. |

* cited by examiner

*Primary Examiner*—Charles Rones
*Assistant Examiner*—Belix M Ortiz
(74) *Attorney, Agent, or Firm*—Samuel S. Lee; Procopio, Cory, Hargreaves & Savitch LLP

(57) ABSTRACT

A repository system for media publishing, comprising: a plurality of storage devices configured to store a plurality of media items, each storage device configured to store a different type of media item than that of other storage devices in the plurality of storage devices; and metadata information relating to the media items stored in the plurality of storage devices, wherein the metadata information enables hierarchical organization of the media items so that the media items can be relatively easily accessed, moved, added, and deleted.

31 Claims, 15 Drawing Sheets

SUPPORT APPLICATIONS FOR RICH MEDIA PUBLISHING

CROSS-REFERENCE TO RELATED APPLICATIONS

This application claims the benefit of priority of U.S. Provisional Patent Application Ser. No. 60/466,431, entitled "Rich Media Publishing", filed Apr. 28, 2003. Benefit of priority of the filing date of Apr. 28, 2003 is hereby claimed, and the disclosure of the Provisional Patent Application is hereby incorporated by reference.

This application is related to U.S. patent application Ser. No. 10/813,868, entitled "Rich Media Publishing", filed Mar. 30, 2004, and U.S. patent application Ser. No. 10/813,858, entitled "Content Management for Rich Media Publishing System", filed Mar. 30, 2004. Disclosures of these U.S. Patent Applications are hereby incorporated by reference.

BACKGROUND

The rapid publication of media content is desirable for publishers intent on delivering media content faster to larger audiences. The digital representation of media content combined with computing and networking technologies now provide a powerful way to publish. According to this new mode of publishing, networking technology permits the delivery of digitized media content over a network to end user computers. Communication protocols define how the digitized media content is exchanged over the network. A media player runs on the end user computer to allow the user to play or otherwise experience the media content.

Digital representations of media content come in different types. These types are generally defined according to a series of publishing variables which can include, but are not limited to, the file format, bit rate, communication protocol(s), physical medium, compression algorithm, and/or digital rights management information associated with the media content. The type of digitized media content used will depend upon a number of factors, such as, the computing and/or networking technology used in the process of publishing and the nature of the content itself.

Digitized media content types can also be categorized according to the type of encoding or compression technique that is used to reduce the physical size of the media content, or according to the type of physical medium that supports the storage of the media content. Different kinds of physical medium are used in publishing media content, such as magnetic or optical storage devices, memory devices, and wireless mediums.

The emergence of a growing number of media players has created a widening gap between the richness of the various types of media content and the diverse capabilities of the client devices to handle the content. As a result, the technology selection process for the end user has become quite complicated. For example, the user often cannot be certain that a given media player will be able to play the type of media content in which he or she is interested. Also, the user may be required to frequently download new media playing software in order to access desired content.

SUMMARY

This disclosure provides system and method for implementing repository for media publishing. In one implementation, a repository system for media publishing, comprising: a plurality of storage devices configured to store a plurality of media items, each storage device configured to store a different type of media item than that of other storage devices in the plurality of storage devices; and metadata information relating to the media items stored in the plurality of storage devices, wherein the metadata information enables hierarchical organization of the media items so that the media items can be relatively easily accessed, moved, added, and deleted.

In another implementation, a method of providing storage for media items in media publishing, comprising: storing a first type of media items in a first storage device; storing a second type of media items in a second storage device; relating first metadata information to the first type of media items; and relating second metadata information to the second type of media items, wherein said first and second metadata information enable hierarchical organization of the media items so that the media items can be relatively easily accessed, moved, added, and deleted.

In another implementation, a method for identifying a source of user referral for a media publishing website, comprising: storing a referring URL in a cookie variable; retrieving the referring URL from the cookie variable during a registration process to enter the media publishing website; and dynamically customizing a home page of the media publishing website according to the referring URL.

DETAILED DESCRIPTION

This disclosure describes systems and methods that provide greater efficiency and simplicity in publication of media contents. As used herein, the term "media contents" refers to any information, including audio, video, images, sound, data, text, other contents, or combination of these contents, which can be perceived by human senses.

Rich media publishing provides an environment for users to create and publish media projects including various types of media. Users can select various media items to be used in a project and then publish a completed project to be viewed and experienced by others.

In one implementation, a user at a desktop or laptop computer connects to a Rich Media Publishing (RMP) server system through the Internet using a web browser software application. The RMP server system presents a web site that, among other services, allows a user to build and publish an RMP project. To build a project, the user selects an RMP template. The template is a presentation framework and includes a number of media slots. Each media slot defines a genre of media (e.g., image, audio, video) and a specific target format (e.g., a JPEG format image that is 320×480 pixels).

The user selects a media item for each media slot in the selected template from a repository according to the genre of the media slot. The repository is part of the RMP server system and stores media items of various genres in various formats. The user can also upload media items to be stored in the repository and select uploaded media items for media slots. The specific format of a selected media item does not need to match the target format of the corresponding media slot because the RMP server system provides transcoding to convert a media item to the target format when presenting the project.

In addition, each template belongs to a category of templates. Templates in the same category have the same number and genres of media slots. While each template may provide a different presentation, the media slots are the same, and so the same media items can be used for templates in the same category. As a result, the user can switch among templates in the same category without changing the media item selections.

After the user has completed building the project, the user can publish the project. The published project is available to the user and other users to access from the RMP server system. When a user accesses the published project, the RMP server system presents the template and the media items assigned to the media slots of the user. The RMP server system provides the media items in the target formats defined by the template and so provides appropriate transcoding. In this way, the user can share media with other users in an enjoyable and creative environment.

Figure 1:
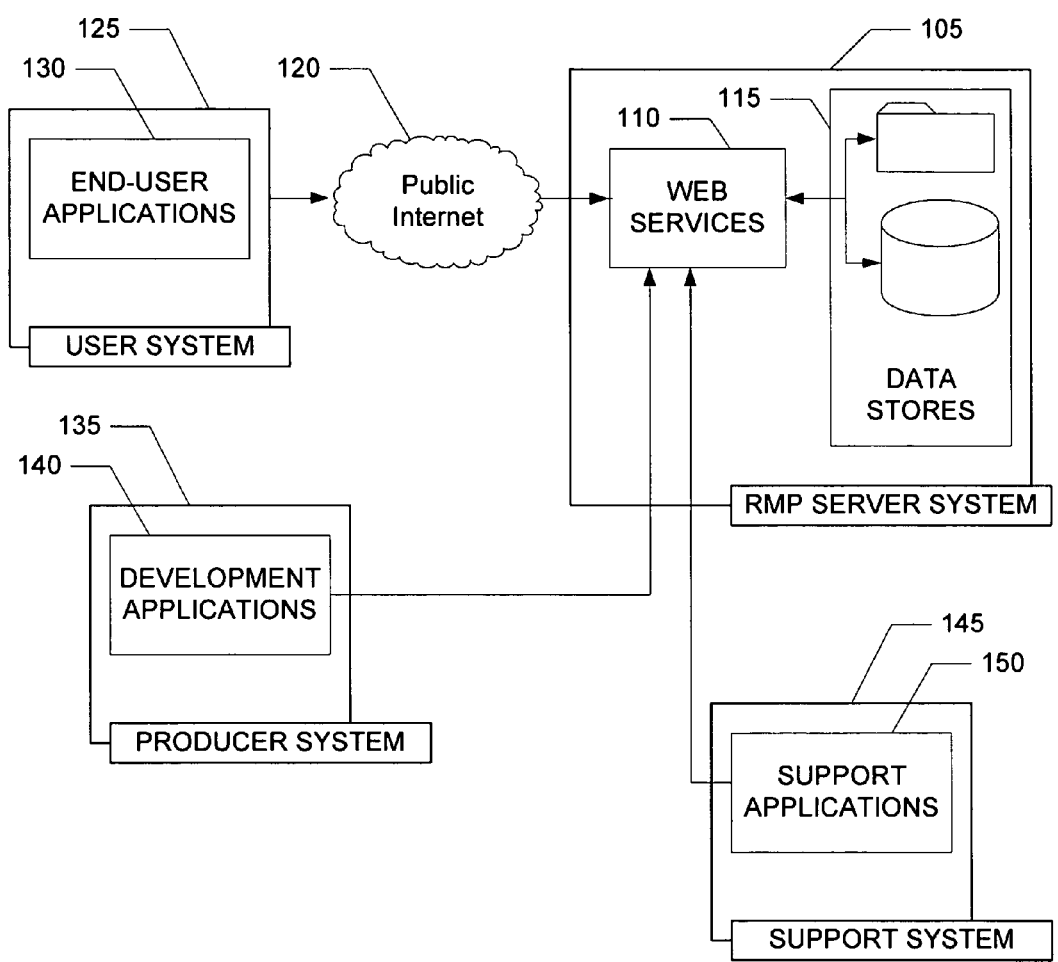
FIG. 1 shows one implementation of a Rich Media Publishing environment.

FIG. 1 shows one implementation of a Rich Media Publishing environment 100. An RMP server system 105 includes components providing web services 110 and data stores 115. The RMP server system 105 includes one or more network servers (not shown) linked together in a local internal network to implement these components. The web services 110 are a combination of application programs to provide the services described below. In one implementation, the web services 110 are presented to a user as a web site including a hierarchy of web pages with embedded controls. The data stores 115 include one or more data storage systems to provide database storage as well as file storage, such as in a hierarchical file system. The RMP server system 105 is connected to the public Internet 120 for communication with clients.

The web services 110 are provided by an RMP platform, a CORE platform (Create Once Render Everywhere), and a content distribution platform. The RMP platform allows users to manage and publish media. The RMP platform includes a Member Publishing service, a Repository service, Repository Filters services, and Administrative services. The Member Publishing service allows users to build RMP projects by manipulating data and media items, as well as data structures forming the RMP templates. As discussed below, templates are built by producers (developers) using development applications. Producers build templates according to guidelines set out in a Template Development Kit, distributed to producers. As discussed below, users interact with the RMP server system through a client system to build a project based on a selected template and selected media items. The Repository service provides a repository that is a virtual file system that allows clients (users and producers) to access media items available to projects. As discussed below, from the user's point of view, the media items are presented for selection and manipulation by the user so as to appear to be stored in a hierarchical file system, while the actual organization of media items and data is hidden from the user. For example, while the user may be shown that all the image media items are grouped together, in fact the image media items are separated by format. The Repository Filters services provide a framework for performing operations on retrieved media items in the course of uploading and downloading media items. As discussed below, a filter performs one or more operations on a media item to convert the media item (non-destructively) from its original format to a format closer to or matching the target format specified by a template. Two examples of filters are an image manipulation system providing resizing of an image, and an audio transcoder for changing the format of an audio media item (e.g., from MP3 to SWF). The Administrative services provide support for customer service (e.g., by allowing data and file access and manipulation by a customer service client). In one implementation, the web services also support subscriptions for user and payment facilities. In addition, the web services can also support different levels of subscriptions and so provide different levels of access to the services and resources of the RMP server system.

The CORE platform provides a multi-renderer multi-language engine that allows multiple user interface (UI) representations to be derived from a single source written in IDML (Interface Definition Markup Language). As stated above, the CORE platform enables Rendering services, UI Management services, Publishing services, and Content Management services (CMS). The Rendering services provide a rendering pipeline for transforming the IDML representation of a UI into a specific XML rendering language (e.g., HTML, WML) and into human readable language. The UI Management services provide support for a UI Management tool used by producers for editing IDML primitives and collections. The Publishing services provide a publishing pipeline that allows clients to select sources for both IDML and content data and target systems for deployment. The Content Management services provide support for managing content areas in the RMP server system 105.

The CDP platform provides support for identity and commerce transactions. The CDP platform includes Identity services and Commerce services. The Identity services support registration and login functionality. The Commerce services provide access to product listings, pricing, and promotions, and support financial transactions (e.g., credit card transactions).

A user system 125 is also connected to the Internet 120. The user system 125 communicates with the RMP server system 105 through the Internet 120. The user system 125 includes one or more end-user applications 130. The end-user applications 130 are for accessing the RMP server system 105 and uploading and downloading data and media items to build, publish, and present RMP projects. In one implementation, the end-user applications 130 include a web browser software application, a member publishing tool, a member publishing viewer, a web folder, an upload control, and storage tools. The web browser is a HTTP/HTML client application. Applications from the RMP server system 105 can run in the web browser, such as a file access application. The member publishing tool runs embedded in the web browser (e.g., as a Flash MX based application) and allows the user to build and publish projects with the RMP server system 105. The member publishing viewer runs embedded in the web browser or as a separate application (e.g., as a Flash 5 of MX based application) and allows viewing of a project. The web folder provides for manipulation of media items and files stored on the RMP server system 105 using a folder-based file interface (e.g., the native Windows Explorer interface). The web folder interacts with the Repository service of the RMP server system 105. The upload control is a control embedded in the web browser (e.g., as an active X (win32 driven) control) and allows users to use "drag & drop" to upload files to the RMP server system 105. The upload control also interacts with the Repository service. The storage tools also provide support for storing media items on the RMP server system 105 (e.g., as native WIN32 applications providing Sonic Foundry tools).

A producer system 135 is connected to the RMP server system 105. In another implementation, the producer system is included within the RMP server system. In yet another implementation, the producer system is connected to the Internet and communicates with the RMP server system through the Internet. The producer system 135 includes one or more development applications 140. The development applications 140 are for accessing the RMP server system 105 to build and support the web services of the RMP server system 105, such as to build and publish templates for users to work with in building projects. In one implementation, the development applications 140 include a CORE UI management tool and a CMS tool. The CORE UI management tool supports building, editing, and publishing IDML user interfaces. The IDML UI's can be designed to be renderer- and language-independent. The IDML UI's can then be published in multiple rendering environments. The CMS tool supports management of content written for a specific renderer. These tools support a separation of content and UI's.

A support system 145 is also connected to the RMP server system 105. In another implementation, the support system is included within the RMP server system. In yet another implementation, the support system is connected to the Internet and communicates with the RMP server system through the Internet. The support system 145 includes one or more support applications 150. The support applications 150 are for accessing the RMP server system 105 to support the web services of the RMP server system 105, such as for maintenance. In one implementation, the support applications 150 include a customer service application. A customer service representative at the support system uses the customer service application to access and control a user's files, media items, and projects.

The RMP environment allows a user to create and publish an RMP project. A user at a user system uses the end-user applications, such as a web browser and member publishing tool, to design the project. The RMP server system builds the project using the Member Publishing service. In addition, the creation of a project is supported by the uploading and selection of media items in the repository of the RMP server system. In one implementation, the RMP server system generates XML and/or HTML code for a project, including links to data and media items stored in the RMP server system. The generated code is used by client systems to present the project.

The Member Publishing service provides access to data structures implementing a collection of templates. A template has a layout and one or more visual and/or audio features (e.g., background image, background video, background music, animations, slide shows, sounds, controls, etc.). The layout and features are set by a producer that built the template (e.g., using HTML code and corresponding media items). The layout and features of a template are generally not to be changed by an end-user. A template also has one or more media slots. A media slot is an open or undefined part of the template. A media item can be assigned to each media slot. In one implementation, a media slot has a data structure (or part of a data structure) to store a reference to an assigned media item. In one implementation, the project is a data structure that includes template data structure according to a selected template and includes a media slot data structure for each media slot in the selected template. It is these media slot data structures that indicate the assigned media items.

Figure 2A:
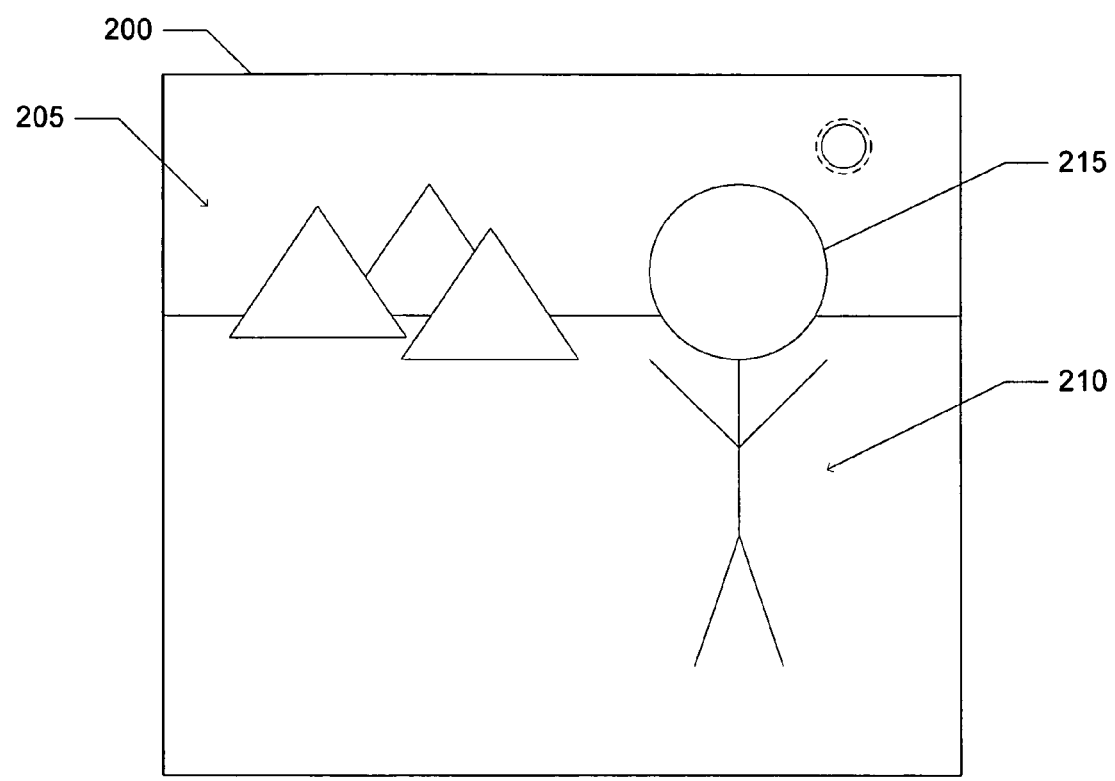
FIG. 2A shows an example of the layout and features of a template.
Figure 2B:
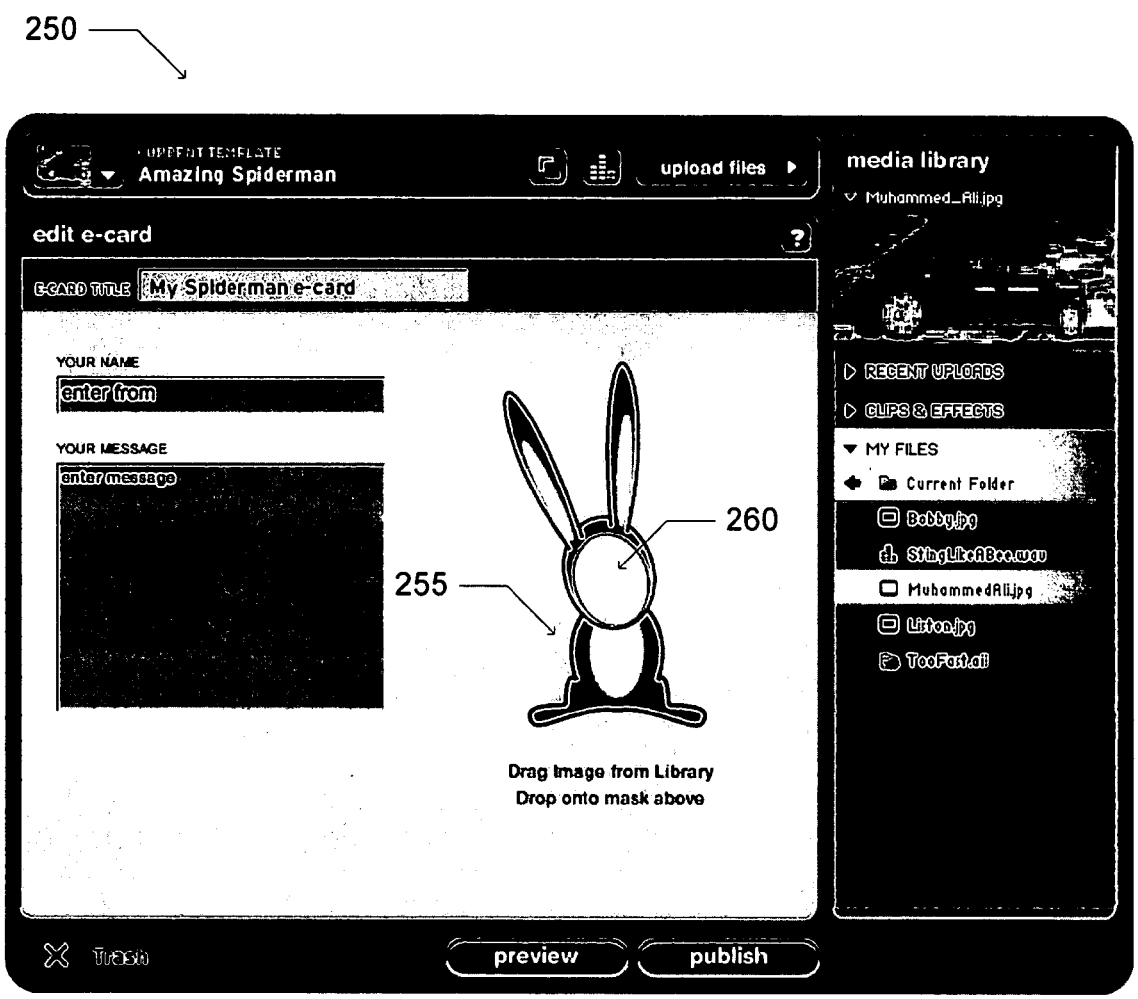
FIG. 2B shows another example of the layout and features of a template.

FIG. 2A shows an example of the layout and features of a template 200. In the template 200, a background image 205, a character body 210, and the position of the character body 210 in the template 200 are set features. The face 215 of the character is blank because the character face 215 is a media slot. A user can select an image and assign the selected image to the media slot for the face 215. FIG. 2B shows another example of a template 250. In the template 250, a rabbit character 255 has a blank face 260 representing a media slot.

A media slot has a genre and a target format The genre indicates the type of media item that can be assigned to that media slot. For example, in one implementation, a media slot can have one of four genres: image, video, audio, or animation. Similarly, the Member Publishing service recognizes or determines a genre for any selected media item. The Member Publishing service prevents a user from assigning a media item of the wrong genre to a media slot. However, within a genre, any format of media item is acceptable. For example, for an image genre media slot, a user can select a JPG file, a GIF file, a bitmap file, or some other still image format file. The target format of a media slot indicates the format in which the template causes the media item to be requested when the media item for the media slot is to be presented. When a project is presented, the media item assigned to each media slot is retrieved and converted to meet the target format of that media slot. The conversion can be performed by the RMP server system, by the client system, or by a combination. These conversions are performed non-destructively so the original media item is preserved in the repository. In addition, these conversions are performed on the fly when the request to present a project is made. Different levels of caching of converted media items can also be provided to improve performance at the cost of storage.

The templates are grouped into categories. Templates in the same category have the same media slots but can have completely different set features. For example, referring again to FIG. 2, a second template in the same category may have a different background scene and a different character body, but still has one media slot for an image. A third template in the same category may have completely different features including multiple image features and background music, but still has one media slot for an image. The media slots in templates in the same category also have a particular one-to-one correspondence. In another implementation, there is a hierarchy of categories. In this case, templates at a lower level have the same media slots as the template above as well as additional media slots (similar to a class and sub-class relationship).

Because templates in the same category have the same number and genres of media slots, the template can be replaced with another template in the same category without reselecting media items. Returning to the example above shown in FIG. 2, if the user selects a new template in the same category, the same image media item assigned to the image media slot in the original template will be assigned to the image media slot in the new template. In an implementation having a hierarchy of categories, a template can be switched to another template in the same specific category or to a template in a parent category at a higher level. When switched to a higher-level template, media slots that are not present in the higher level template are dropped or rendered inactive.

From a data structure standpoint, in one implementation, the project data structure has a member for the features (the set features that do not change) of the selected template and for each media slot according to the selected template. Each media slot member indicates a corresponding media slot data structure. Each media slot data structure in turn indicates a media item. When the template is changed, the media slot data structures are not changed, but instead only data structures reflecting the features of the new template are changed. In another implementation, as discussed above, when the template is switched, the data structure for each media slot, or a reference to that data structure, is passed to the corresponding media slot in the new template (e.g., the data structure for the corresponding media slot in the new template is set to store the reference to the same media item). For example, the first media slot of the original template indicates a media item assigned to the first media slot by storing a reference to a data structure indicating the media item. When a new template is selected to replace the original template, the reference for the first media slot is passed to the new template and the first media slot of the new template is set to store that reference. As a result, the first media slot of the new template then indicates the same media item as had been indicated in the original template. Various other data structure implementations are also possible.

A template can also have different versions for different platforms (e.g., computer web browser and phone web browser). Similar to templates in the same category, platform templates (i.e., different versions of a template for respective platforms) have the same genre and number of media slots and so are interchangeable, but the target format and characteristics of the media item requested can vary (e.g., requesting different resolution images to accommodate different display devices). Similarly, the layout and features between platform templates can be different. A project can list a single template and the initial connection and requests from the user system establish the platform of the user system and so which platform template to use. Accordingly, in one implementation, the details of the platform template are kept at the RMP server system while the code for the project on the user system is the same for each platform. In another implementation, some media slots include variable characteristics that are dependent on the characteristics of the platform. In this case, the requests for media items are customized by user system according to the characteristics of the user system.

In another implementation, a template also includes settable features. A settable feature controls an aspect of the presentation of a project such as background color or font characteristics. A settable feature does not have an assigned media item. As discussed above, media items are assigned to media slots. In one implementation, the settings for settable features are reflected in HTML code for the project built according to the template. The settable features in templates in the same category also match to facilitate seamless transition between templates. In another implementation, the settable features are unique to some or all templates and so do not carry over between templates in the same category. As described below, a user selects settings for the settable features while building the project. In another implementation, settable features are set automatically according to settings in a user profile.

Figure 3:
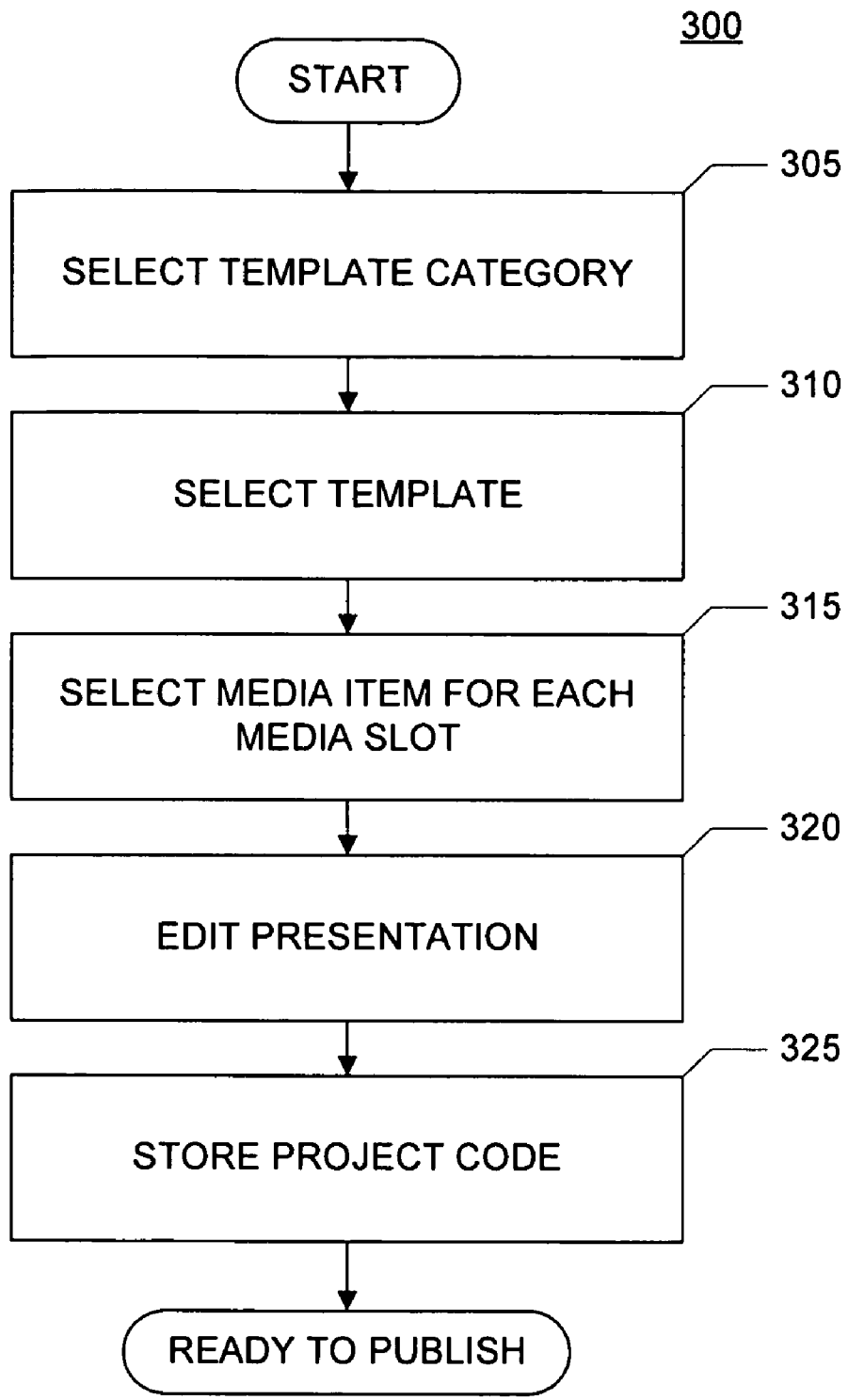
FIG. 3 shows a flowchart of one implementation of building a project.

FIG. 3 shows a flowchart 300 of one implementation of building a project. Before beginning, a user establishes a connection to the RMP server system and accesses the Member Publishing service (e.g., by navigating through a web site to a member publishing section). The user is presented with a collection of template categories and selects a category, block 305. As described above, templates in the same category have the same number and genre of media slots. In one implementation, each category represents a type of presentation with each template in the category representing a particular style of that type of presentation. Examples of categories include, but are not limited to, albums, journals, scrapbooks, music players, e-cards, and games. The RMP server system can present the categories for selection in various ways, such as in a list or a representation of folders similar to or within the repository.

After selecting a category, the user is presented with a collection of templates and selects a template, block 310. The RMP server system can present the templates in various ways, such as in a list of thumbnail images, or a representation of folders similar to or within the repository. The RMP server system presents to the user one or more previews of how a project according to a template would appear. The user can preview multiple templates before selecting one template to use for the project. The user can also later change to another template. However, if the user changes to a template in a different category, some or all selections of media items may be lost.

After selecting a template, the user selects media items for the media slots in the selected template, block 315. The user selects a media item for each media slot in the template. The Member Publishing service supports selecting media items using various techniques, such as from a list, by entering a name, using drag and drop, or selecting from the file system representation of the repository. A user can select a default or recommended media item. A template can have a default media item assigned to one or more media slots and the user can select this default media item by not changing the assignment. A template can have one or more recommended media items for a media slot and the user can select one of the recommended media items, such as from a list. Default and recommended media items can also be established at a higher level than the template, such as for a category or for all templates. In another implementation, marketing information is used to recommend media items to users. Default and recommended media items can also be linked together into groups to form a set for the template. In addition, when switching between templates in the same category, when a default or recommended item has been selected in the original template, the default or recommended item for the same media slot in the new template can also be used (although this new item may be a different media item). Default and recommended media items are stored in the repository.

A user can select a media item stored in the repository. The Member Publishing service and the Repository service present to the user a virtual file system of media items to select from. For example, the user is presented with a hierarchy of folders of different types of media items organized by the genre and content of the media items (e.g., images of celebrities are grouped together). As discussed below, the Repository service hides the actual data storage of the media items (e.g., where media items are stored as physical files on one or more servers organized by location which determined by a hash map algorithm) and instead presents the virtual file system. The repository includes media items provided by the RMP server system, media items uploaded and stored by the user (e.g., in a virtual set of folders under "My Files"), and media items uploaded by other users and made public.

A user can upload media items to the repository through the web browser application on the user's system. The web browser supports various techniques for uploading files, such as the web folder, the upload control, and the storage tools discussed above. The user can select a media item stored on the user system and cause the upload using a native file service of the user system that interacts with the web browser or by providing a pathname to the web browser. The user can also drag and drop a media item from within the GUI of the user system to the web browser. The drag and drop support allows a user to drag and drop a media item directly into the web browser window and does not require a separate window or interface as a visual target for the drag and drop operation. In one implementation, the drag and drop support is provided through an embedded ActiveX control.

A user can also select a media item stored outside the repository. The user selects a media item from a source location, such as the user system or another network system, and the media item is uploaded to the repository. A reference to the selected item is stored in the repository (e.g., as a "virtual" media item).

While the user is selecting media items, the RMP server system presents a preview of the project with the selected media items. Alternatively, the preview is presented upon demand. In this way, the user can evaluate the choices made and change selections to improve the project. The user can also change the template while selecting media items. If the new template is in the same category as the former template, the selected media items are preserved and the user does not need to select the media items again. In an implementation supporting settable features, the user also selects settings for the settable features at this time.

As the user selects a template and media items, the user can also edit the presentation of the project, block 320. As noted above, the RMP server system presents a preview of the project. The user can adjust various aspects that the template has defined as being adjustable. The user can change the settings for settable features. The user can also adjust the presentation of media items that have an adjustable presentation style. For example, an image media slot may have an adjustable size within the template. Another type of media slot has an adjustable level of zoom or rotation for an image or an adjustable cropping portion to present different sections of the image. Another type of media slot for an audio media item has an adjustable volume or balance. The adjustments are recorded in the project and included in the request to retrieve the media item when the project is presented. The RMP server system provides the adjustments in presenting the media items as a conversion or filtering applied to the stored media item. The RMP server system returns the result to the presenting application and caches a copy of the result for future use. The original media item is not changed. Alternatively, changes can be applied by the web browser application on the user system, or a combination of changes can be applied at the RMP server system and at the user system.

As the user makes the selections and edits for the project, the RMP server system builds and updates project code for the project. The project code is code to be used by the web browser of a user to present the project to the user. The project code includes instructions according to the template and the selections and edits made by the publishing user to present the project to a user according to the publishing user's design. For some elements of the project, the project code includes instructions to the web browser on what to present, such as text or a background color. For media items assigned to media slots in the project, the project code includes requests to be sent to the RMP server system. A request indicates the target format in which the RMP server system is to provide the media item. A request can also indicate other changes or adjustments the RMP server system is to apply to the media item, such as resizing. The project code can also include instructions for the web browser for modifications to apply to the received media items, such as rotation. In one implementation, some or all of the features to be presented as part of the project are included in the project code as references to resources or code on the RMP server system. In this way, the RMP server system provides for syndication of changes, such as when templates are updated. Any changes made to the data and template underlying a project will be provided transparently to the presented project without changing the project code. The referenced resource may change, but the reference itself can be maintained.

When the user has completed editing, the RMP server system stores the project code, block 325. The RMP server system provides storage for a user to preserve projects that have not yet been published. The user can return to the project for further editing at a later time. When the user has finished editing a project, the user can publish the project. The user can later retract a published project or a copy of a published project to the workspace area for modifications.

Figure 4:
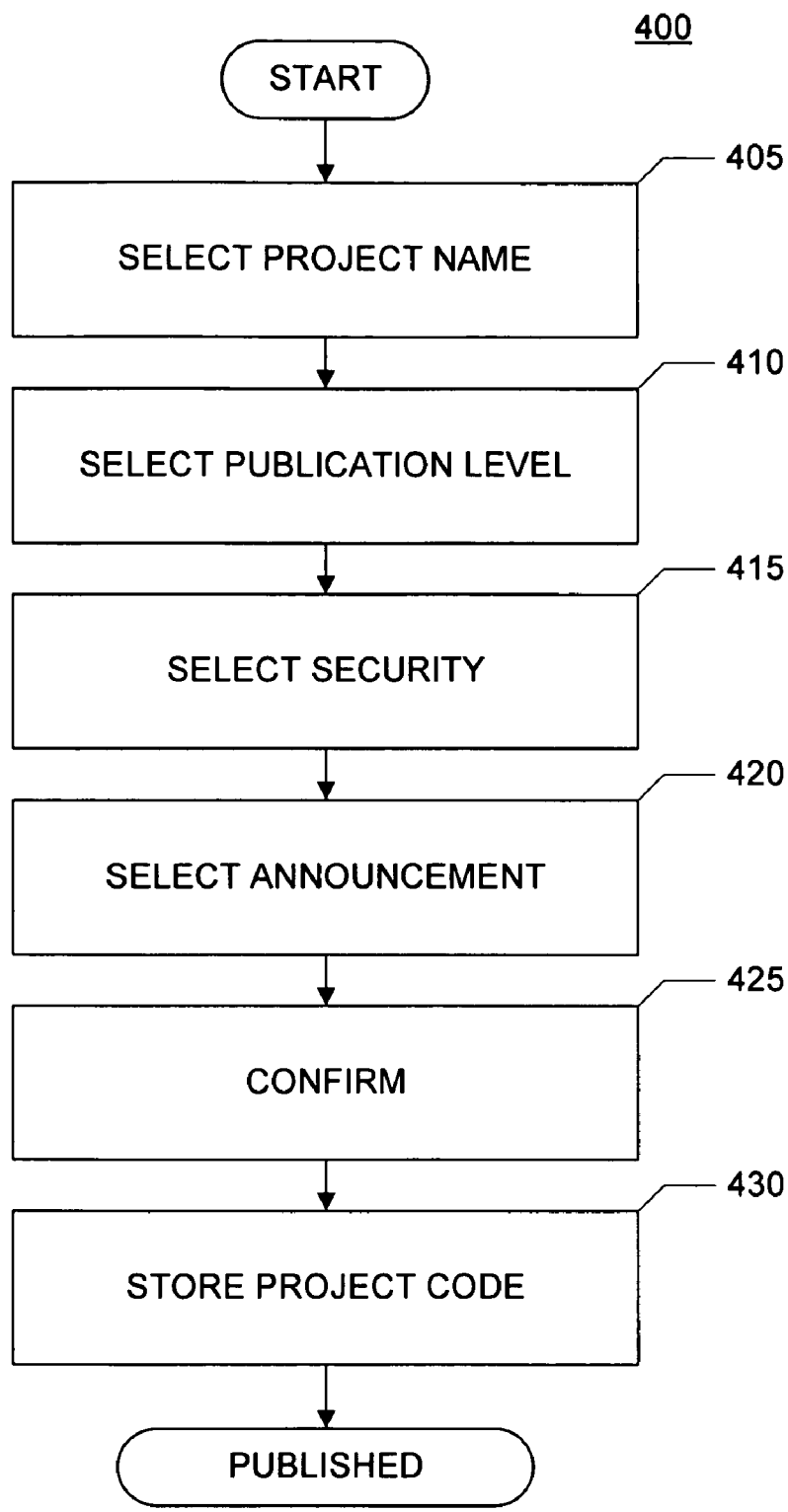
FIG. 4 shows a flowchart of one implementation of publishing a project.

FIG. 4 shows a flowchart 400 of one implementation of publishing a project. After a user has finished making selections and editing the presentation of a project, the user can publish the project so that other users can access and experience the project. The user selects or enters a publishing name for the project, block 405. The publishing name is the name that will be used for other users to access the published project. In one implementation, the publishing name is part of a URL provided to users to access the published project.

The user selects a publication level for the project, block 410. The publication level indicates a range of users that will have access to the project. At a public level, any user with access to the RMP server system will be able to access the project. In one implementation, the RMP server system provides galleries of projects including a public gallery of projects which are available to users of the RMP server system. At a subscriber level, users that are subscribers to the RMP server system services will be able to access the project. At another level of access, a defined group of users can access the project. In an implementation supporting galleries, the RMP server system provides personal galleries for users where the user can define which other users are allowed to enter the user's personal gallery and access projects within that gallery. The RMP server system can also provide other levels of access, such as limited to the user only, limited to users with an invitation from the publishing user, or limited to premium subscribers.

The user can also select a security level for the project, block 415. The security level restricts access within a publication level. For example, a user can assign a password to a project so that only users that enter the proper password can fully access the project. In one implementation, a user without the password can access a preview of the project, but cannot fully access the project. The RMP server system can support various types of security mechanisms, such as digital signatures.

The user selects how to announce the published project, block 420. The RMP server system provides an email notification system for new projects. In one implementation, the email announcement includes a URL to access the project. The recipient can then activate the URL (e.g., click on it) to proceed directly to the project. The user selects or provides one or more email addresses to receive a notification of the newly published project. In one implementation, the user provides email addresses from an email application program on the user system. In another implementation, the RMP server system maintains an email directory of subscribers to the RMP server system to facilitate notifications. In another implementation, the RMP server system provides a newsletter or news service to subscribers and the user can select whether to include a notice in the news service of the publication or not, as well as what kind of notice.

After reviewing the selections made for publication, the user confirms the selections, block 425. Once the confirmation has been received, the RMP server system stores the project code in storage for published projects and establishes access and security according to the user's selections, block 430. The RMP server system also provides notifications as indicated by the user's selections.

Figure 5:
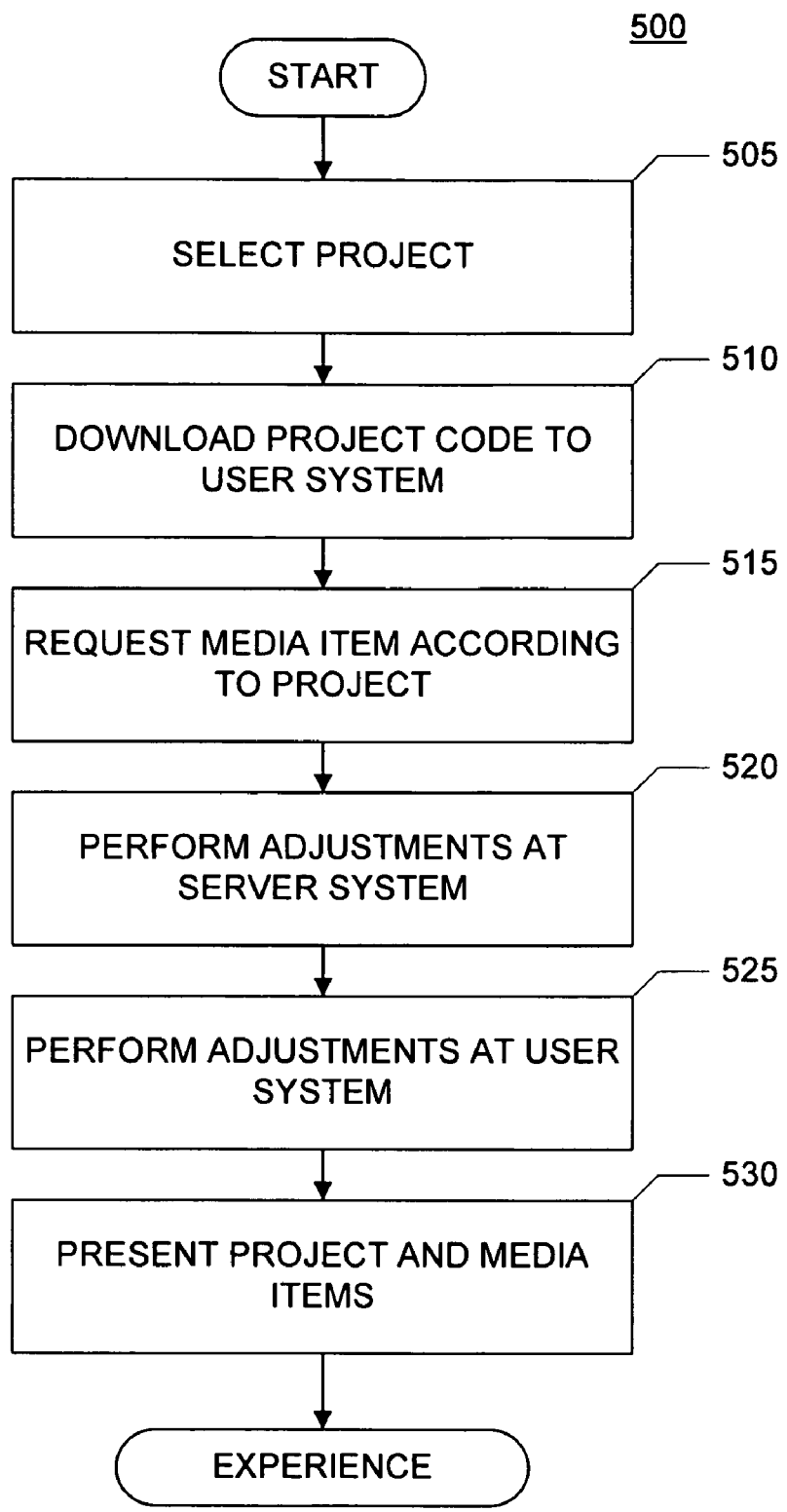
FIG. 5 shows a flowchart of one implementation of accessing a published project.

FIG. 5 shows a flowchart 500 of one implementation of accessing a published project. Once the project has been published, users with the appropriate level of access and providing the appropriate security can access the project. A user accesses the RMP server system and selects a project to experience, block 505. A user can browse through public collections or galleries of projects or personal galleries that are open to the user. A user can also request a particular project, such as by name. If a user has received a URL for a project, the user can access the project directly using the URL without navigating through the RMP server system web site.

After selecting the project, the web browser at the user's user system downloads a copy of some or all of the project code for the project, block 510. The project code is the code built and stored by the RMP server system when the publishing user built the project. The project code includes instructions for the web browser to present the project including downloading media items. The web browser does not necessarily immediately download all the media items assigned to the project. The web browser can request and download the media items on demand as the project is presented.

As media items are to be presented in the project according to the user's actions and the project code, the web browser requests media items from the RMP server system, block 515. The project code includes a media item request for each media item assigned to the project. A media item request indicates the media item, the target format, and any modifications the RMP server system is to apply to the media item according to the characteristics of the settings of the media slots. As discussed above, media items can be presented as they are in storage, in a different format, or adjustments can be applied to the media item. For example, an image media slot in the project that has a target format of JPEG sends a request to the RMP server system for the media item to be presented as a JPEG media item. If the media item assigned to that media slot is in fact a different format, such as a GIF media item, the RMP server system applies a filter to convert the GIF item to a JPEG item and sends the JPEG item to the requesting user system. The request can also include additional adjustments to the media item, such as resizing.

When the RMP server system receives a media request from the web browser, the RMP server system retrieves the indicated media item and applies the appropriate modifications, block 520. The RMP server system maintains a cache of generated adjusted media items. The RMP server system first checks if there is already a copy of a media item matching all aspects of the request in the cache. If so, the RMP server system does not need to perform further modifications and returns a copy of the cached item. If not, the RMP server system retrieves the original media item from the repository. The RMP server system checks if the media item is in the format requested as the target format. If not, the RMP server system applies a filter to generate a new copy of the media item in the target format. If the request includes additional modifications to be applied to the media item, such as resizing, the RMP server system applies the additional modifications to the filtered media item to match the request. The RMP server system returns the adjusted media item to the user system and stores a copy in the cache.

In one implementation, the RMP server system also checks the cache for partial matches to the request. In this case, if the cache includes an item that matches part of the request without additional modifications, the RMP server system retrieves that item and applies the remaining modifications to match the request. For example, where the request is for a JPEG image at a particular resolution, the RMP server system checks the cache and determines that there is not a JPEG image at that resolution for the indicated media item in the cache, but determines that there is a JPEG image at a different resolution for the indicated media item in the cache. Instead of retrieving the original media item, which may be in a different format and could require a filter to be in JPEG format, the RMP server system applies an adjustment to change the resolution of the cached item to match the request, creating another copy in the cache. The RMP server system returns the new adjusted media item matching the request. The RMP server system can use a priority system to determine which partial matches to use. In another implementation, the RMP server system determines whether it is better (e.g., faster) to undo one or more changes that have been applied to a cached copy and then work forward rather than starting from the original media item or from a cached copy that has less changes applied.

In one implementation, the RMP server system provides the media item to the web browser through a secure connection or using security measure to control access. The RMP server system can use encoding for some or all media items sent to the user system (e.g., encoding items that are not free). The RMP server system can also use access links that have a limited lifespan so that a request for the same media item will need to use a new access link after a period of time. As part of accessing the project, the web browser receives and updates the access links to maintain fresh links.

After the user system has received the media item matching the request from the RMP server system, the web browser applies any additional changes indicated by the project code to the received media item, block 525. As discussed above, the project code can indicate that some modifications to a media item are to be applied by the web browser rather than at the RMP server system. For example, the project code may indicate that, after the web browser receives the media item from the RMP server system, the web browser is to apply changes such as rotation, clipping, brightness adjustment, or volume adjustment. The web browser follows a similar pattern to download and adjust any other media items as indicated by the project code.

After applying any local adjustments, the web browser presents the project and media items to match the project code, block 530. Some aspects of the project do not require media items to be downloaded and are generated at the user system, such as fonts and colors. As the user interacts with the project through the web browser, the project code may indicate modifications are to be applied resulting in local adjustments made by the web browser, new media item requests for the RMP server system, or combinations thereof.

In another implementation, layout information and features of the project other than media items are also stored as requests in the project code so that these items are also downloaded from the RMP server system. In this way, changes can be made at the RMP server system to templates or media supporting templates (e.g., background images or music) and these changes will appear in all projects using the templates as a result of the requests being sent back to the RMP server system.

In one implementation, the web browser and target formats used for media items protects the media items from unwanted copying (unwanted from the publishing user's or content owner's point of view). In one implementation, the rendering functionality of the web browser does not present any copy or save facility to a user. So the user can view the images and video of a presentation, but the web browser does not directly support preserving the media items. A similar approach can be used with audio media items. In this way, it is difficult for users to make unauthorized copies of media items presented in projects. This extra security may make it more desirable for content providers and users to upload or provide access to content to be included in projects.

In one implementation, the RMP server system provides a code publishing service. A user can download a copy of the project code for a project and include that project code in any network accessible location. The user (or another user) can then access the stored project code and experience the presentation without downloading the project code from the RMP server system. The RMP server system will still be involved in the presentation because the media items assigned to the project are stored on the RMP server system, as well as some features of the project (e.g., template layout).

In one implementation, the RMP server system supports searching. A user can search for media items, templates, or other data available through the RMP server system. The searching can apply to data provided by the RMP server system or to data uploaded to the RMP server system by the user, another user, or a content provider.

In one implementation, the searching returns results that are context sensitive. In one implementation, the search engine filters the results according to a user profile. Some media items available to the users are not available for free. A user profile may specify a price limit for search results. Some media items are available to users according to their subscription level. A user profile may indicate only to return search results that are at a certain subscription level. Alternatively, the search engine may return only those results that are at the user's subscription level.

In another implementation, the search engine provides a preview feature. The search engine allows a user to select a search result and retrieve a preview of the indicated item, such as a thumbnail of a template or image, or a short segment of a video or audio item. This preview may be provided for a pay item before the user purchases the media item for inclusion in a project.

The RMP server system also stores data in one or more databases and/or files to support the operation of the web site. This data is referred to herein as producer data. Producer data includes data to implement the templates, other than the media item data stored in the repository. Producers can access and modify media data in building and modifying templates.

The RMP server system is supported by a client-side Content Management Services (CMS) tool. The CMS tool is for content management to allow producers to access and manage the producer data and any media data needed for development. The CMS tool works with a multi-environment publishing pipeline to control access to and distribution of producer data as it is being developed. For example, one publishing pipeline supports three environments: a developing/production environment, a staging environment, and a live environment. Each environment maintains a separate store of data. When a producer begins work on a template (for example), the producer creates and edits the template and associated data in the development environment. When the producer has completed the development work, the producer migrates the template and data to the staging environment. A complete copy of the data is brought to the data storage of the next environment. In the staging environment, the template and data are tested and reviewed. When the template and data are approved, they are migrated to the live environment. Again, a complete copy of the data is brought to the data storage of the next environment. In the live environment, users can access the template and data for member publishing. Back-end constraints are provided to insure that database conflicts are avoided from environment to environment.

In one implementation, producers are restricted to accessing data only in the development environment. Any changes made are submitted as updates up through the pipeline. As updates are moved upward, the updates are applied to the versions of data stored for each environment. In one implementation, the entire data set is not migrated upward, but only the data or files that have been marked as modified.

In another implementation, a different number of environments are supported, such as two, or four, or more. The number is customized to the goals of the RMP server system, producers, and users.

In another implementation, the RMP server system provides simultaneous support for publishing of database items and physical files, using the same user interface protocols. To a producer using CMS, database items are published in the same manner, e.g., with the same "PUBLISH/DELETE" flags for all items shown in the UI. The list of physical files to be published is constructed using a method that traverses both source and destination file system trees, producing a list of differences that is displayed to the producer as files to be PUBLISHED or DELETED. This list is a selectable list of publishable physical files.

In another implementation, a producer can preview data through the CMS. A producer can preview a specific piece of producer content or a specific physical file directly from the content management system (e.g., style sheets and JSPs, allowing a WYSIWYG preview of *ML content). In one implementation, the CMS tool provides a "Preview" button or supports a "double-click" of a particular item. The preview automatically launches the appropriate application or browser needed to see the content/file, and automatically performs the necessary transformations on internal markup language strings, using configuration settings and paths, allowing that content to reference other content elements correctly. The producer can then avoid having to access the content separately using the end-user rendering system.

As discussed above, a repository is a storage system for the media items available to and used in projects built and published through the RMP server system. The repository can be implemented as one or more storage devices using one or more databases. In one implementation, each type of media item is stored in a respective storage device (e.g., JPEG images on one storage device, MP3 files on a second storage device, streaming media on another storage device, and so on). The repository maintains information about the stored media items to present a virtual hierarchical file system to the user so that the user can relatively easily access, move, add, and delete (etc.) media items according to a hierarchical organization. The user can create and delete folders in the repository and the RMP server system will present the media items according to these folders even though the actual storage organization in the repository may be quite different. In addition, each user can have a different view of the data in the repository as the users build different file structures, such as through the creation and modification of virtual folders. Users can also customize the presentation features, such as types of folders, colors, etc.

The RMP platform includes a repository service and a repository Filter services. The Repository service provides a repository that is a virtual file system that allows clients (users and producers) to access media items available to projects. From the user's point of view, the media items are presented for selection and manipulation by the user so as to appear to be stored in a hierarchical file system, while the actual organization of media items and data is hidden from the user. For example, while the user may be shown that all the image media items are grouped together, in fact the image media items are separated by format. The online repository service can be configured as a Web-based Distributed Authoring and Versioning (WebDAV) facility. The repository filter services provide a framework for performing operations on retrieved media items in the course of uploading and downloading media items. As discussed below, a filter performs one or more operations on a media item to convert the media item (non-destructively) from its original format to a format closer to or matching the target format specified by a template. Two examples of filters are an image manipulation system providing resizing of an image, and an audio transcoder for changing the format of an audio media item (e.g., from MP3 to SWF).

In one implementation, the repository's layers include a communication servlet and a servlet filter. The servlet lets users manage files (i.e., assets) via WebDAV-issued commands. The servlet, for example, transfers a file over to the file system store of the servlet, and registers the appropriate metadata about the file (e.g., file path, application attributes, etc.). The servlet filter is an object that can transform a request or modify a response. Thus, in one implementation, the filter acts as a pre-processor of the request before the request reaches a servlet. In another implementation, the servlet filter acts as a post-processor of the response leaving a servlet. In other implementations, the servlet filter modifies the request headers and request data by providing a customized version of the request object that wraps the real request, or modifies the response headers and response data by providing a customized version of the response object that wraps the real response.

Figure 6:
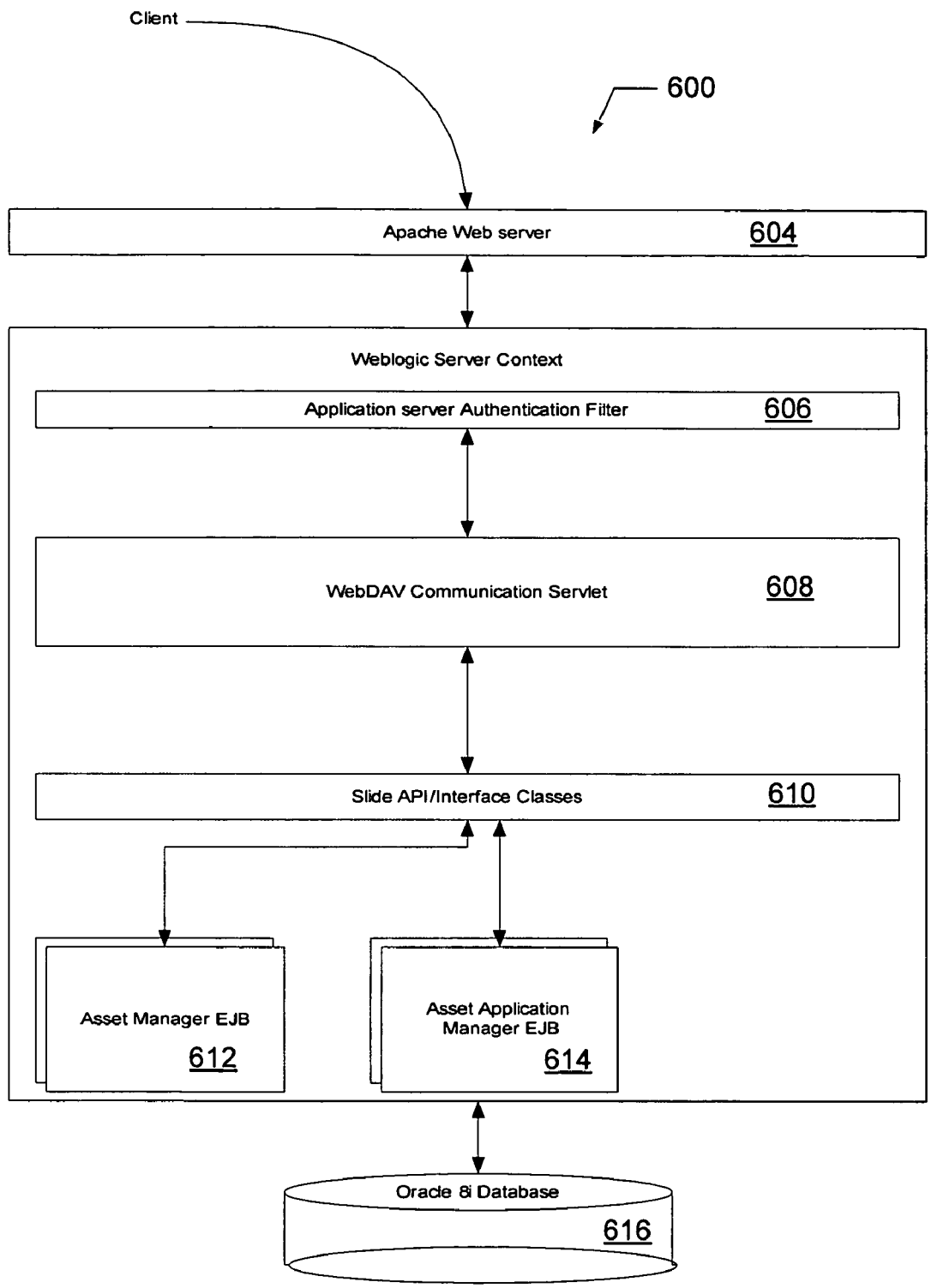
FIG. 6 illustrates one implementation of an online repository service including different WebDAV components.

FIG. 6 illustrates one implementation of an online repository service 600 including different WebDAV components. In the illustrated embodiment, the user or client 602 issues a WebDAV command (e.g., Add/Create file/folder, remove file/folder, rename file/folder, copy file/folder) configured as an HTTP request, which is forwarded (through configuration mapping) to the WebDAV server entry point 604. Before the WebDAV servlet 608 starts processing, an authentication filter 606 checks to determine if a submitted cookie is present. If the cookie is present, the filter 606 proceeds to verify that the user has a log-in token. If the user 602 has a log-in token, the user 602 is granted access and the servlet 608 is invoked. Otherwise, the filter 606 returns a correctly-formatted WebDAV error to the user 602.

The WebDAV servlet 608 processes the WebDAV request, and alters/adds/removes the metadata about the file/folder through the application program interface (API) 610. The servlet 608 also invokes the data service layer Enterprise Java Beans (EJB) Managers (e.g., Asset Manager 612, Asset Application Manager 614) responsible for all database communication. The WebDAV servlet 608 also executes the issued command by operating on the physical datastore (filesystem) 616. Once the entire WebDAV request has been executed, a correctly formatted WebDAV success response will be issued back to the user 602 through the HTTP response object.

In one implementation, My Files Manager (MFM) is a main application managing user assets and interfacing with the online repository. Thus, the MFM acts as an integrated WebDAV client. The MFM application module logic is encapsulated as runtime classes that are executed within the context of the dynamic execution engine. The application module code has a direct dependency on dynamic functionality being in place.

Figure 7:
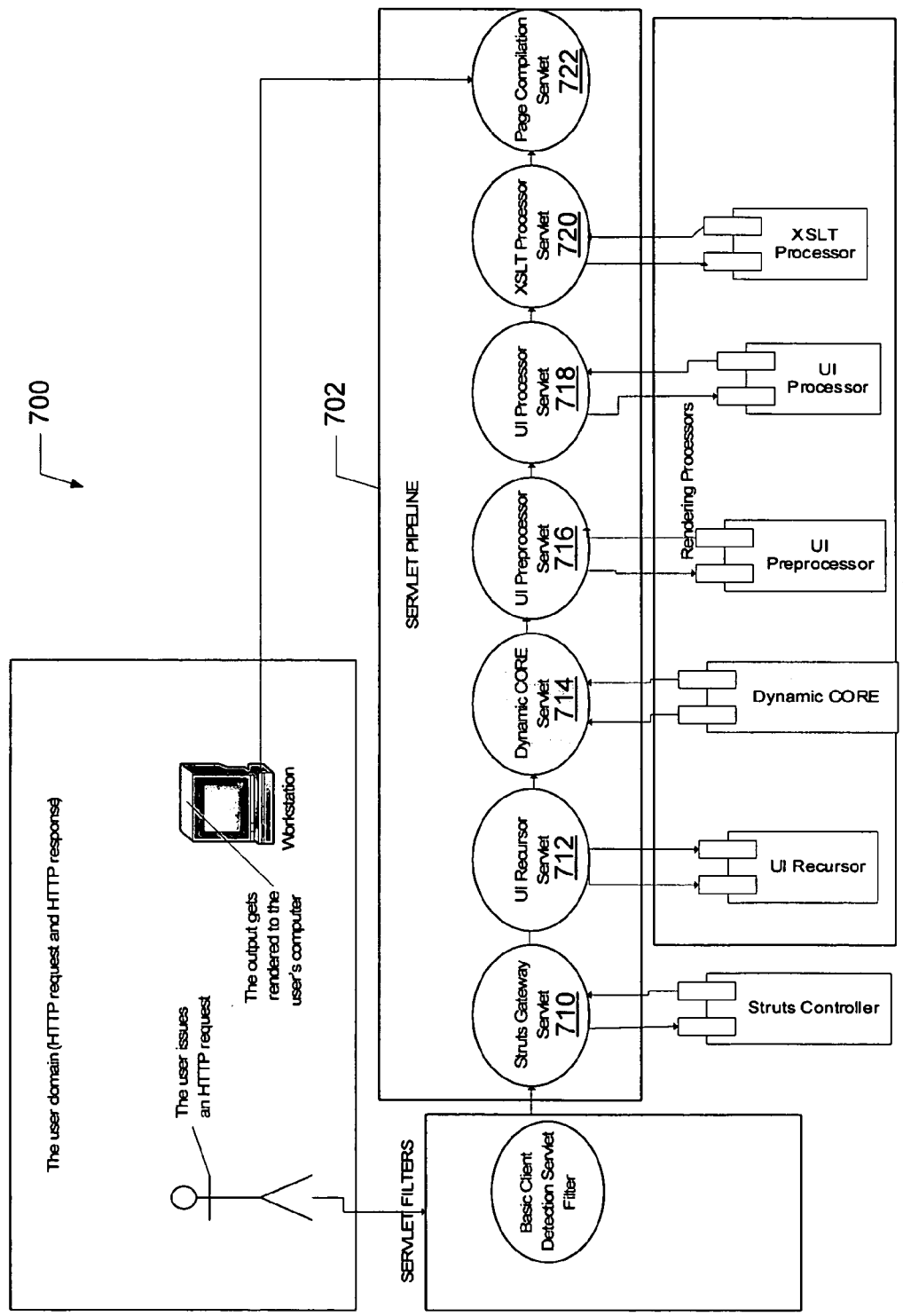
FIG. 7 shows one implementation of the MFM application logic configured to communicate with the database through the regular EJB.

The MFM is a combination of IDML pages with embedded dynamic tags that insert its output directly into the IDML page, before it is handed off to the preprocessing module. FIG. 7 shows one implementation of the MFM application logic 700 configured to communicate with the database through the regular EJB. Thus, an HTTP request for an MFM dynamic IDML page goes through logical steps (through the servlet pipeline 702) according to FIG. 7.

The pipeline 702 includes a gateway servlet 710 referred to as a Struts Controller servlet. This servlet 710 is the first entry servlet based on an architectural design pattern for interactive applications, which organizes an interactive application into three separate modules. The first for the application model with its data representation and business logic; the second for views that provide data presentation and user input; and the third for a controller to dispatch requests and control flow.

The pipeline 702 also includes a recursor servlet 712, a dynamic core servlet 714, a pre-processor servlet 716, processor servlets 718, 720, and a page compilation servlet 722. The recursor servlet 712 expands the IDML page to reference all "static" IDML items in the MFM page. The dynamic core servlet 714 executes dynamic tags included in the MFM pages. The dynamic tags reference objects (classes belonging to the logical MFM application module). All output is in IDML and inserted into the IDML page where the referring tags are located. Objects all represent different functionality of each page, and may be reused across pages.

Figure 8:
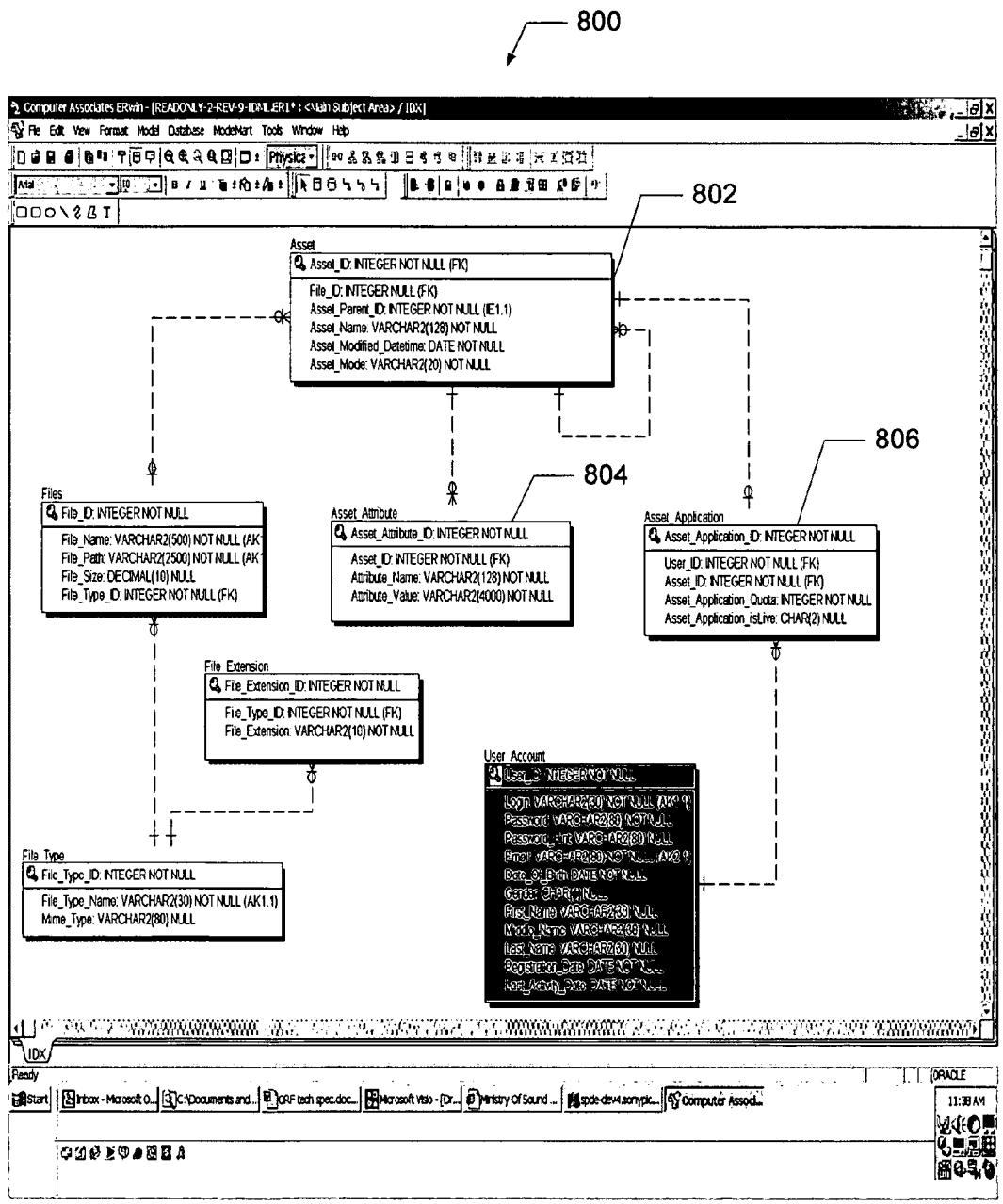
FIG. 8 shows a flow diagram of asset-related tables configured for online repository in accordance with one implementation.

FIG. 8 shows a flow diagram of asset-related tables configured for online repository in accordance with one implementation. The asset-related tables are used to encapsulate data. The online repository tables include an Asset table 802, an Asset_Attribute table 804, and an Asset_Application table 806.

The Asset table 802 is a recursive table that encapsulates the relation for each file and folder. The table 802 has a foreign key relation with the shared CORE File table (and its structure). When an asset represents a file, one asset is linked to one file. When an asset represents a folder, the file foreign key will be null. There is a special file/folder flag field (Asset_Mode) that indicates whether the current Asset record encapsulates a file or a folder. The Asset_Attribute table encapsulates additional metadata for each file or folder that has additional metadata. The Asset_Application table encapsulates information about asset ownership. This table is used to link user accounts.

As indicated above, the repository filter services provide a framework for performing operations on retrieved media items in the course of uploading and downloading media items to and from the repository. The purpose of the repository filter services is to allow applications accessing the repository to conduct operations on the media stored in the repository. In general, applications can request files from the repository, which will be returned based on access rights of the user. There are cases when the output format requested by the application for a particular media file is different than the format of the file (e.g., an imaging application requesting a file stored as BMP to be sent back as a JPG file). The repository filter plug-in framework provides an environment for this file manipulation logic. Two examples of filters are an image manipulation system providing resizing of an image, and an audio transcoder for changing the format of an audio media item (e.g., from MP3 to SWF).

Figure 9:
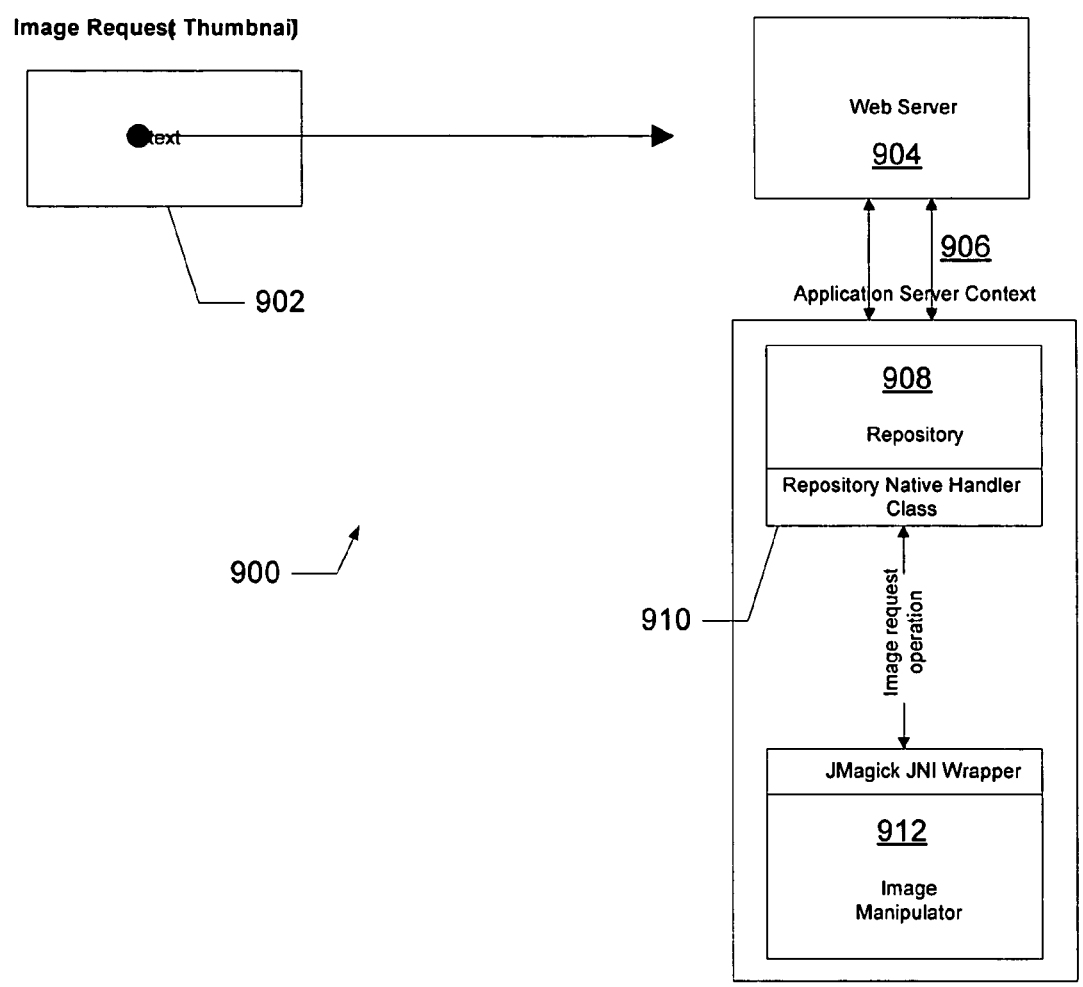
FIG. 9 illustrates one implementation of a typical operations flow for an image manipulation system, which is configured as a repository filter.

FIG. 9 illustrates one implementation of a typical operations flow for an image manipulation system 900, which is configured as a repository filter. Initially, an image request 902 is received with extra Uniform Resource Identifier (URI) parameters indicating that the image requested must undergo resizing. For example, URI may include specified X (width) and Y (height) parameters. In the illustrated implementation, the request 902 is received at a web server 904.

The request 902 is delegated to an application server thread 906 that requests the file from the repository 908. A native handler class 910 checks to determine if the file already exists in a special cache directory. Otherwise, if no matching file exists in the cache, an image manipulator 912 processes the file and outputs scaled data. The scaled data is saved as a new file and stored in a separate cache directory (an instance is created in the RF_Cache table). The new file is then returned by the application server 914 to the web server 904, which serves up the image to the requesting client.

Figure 10:
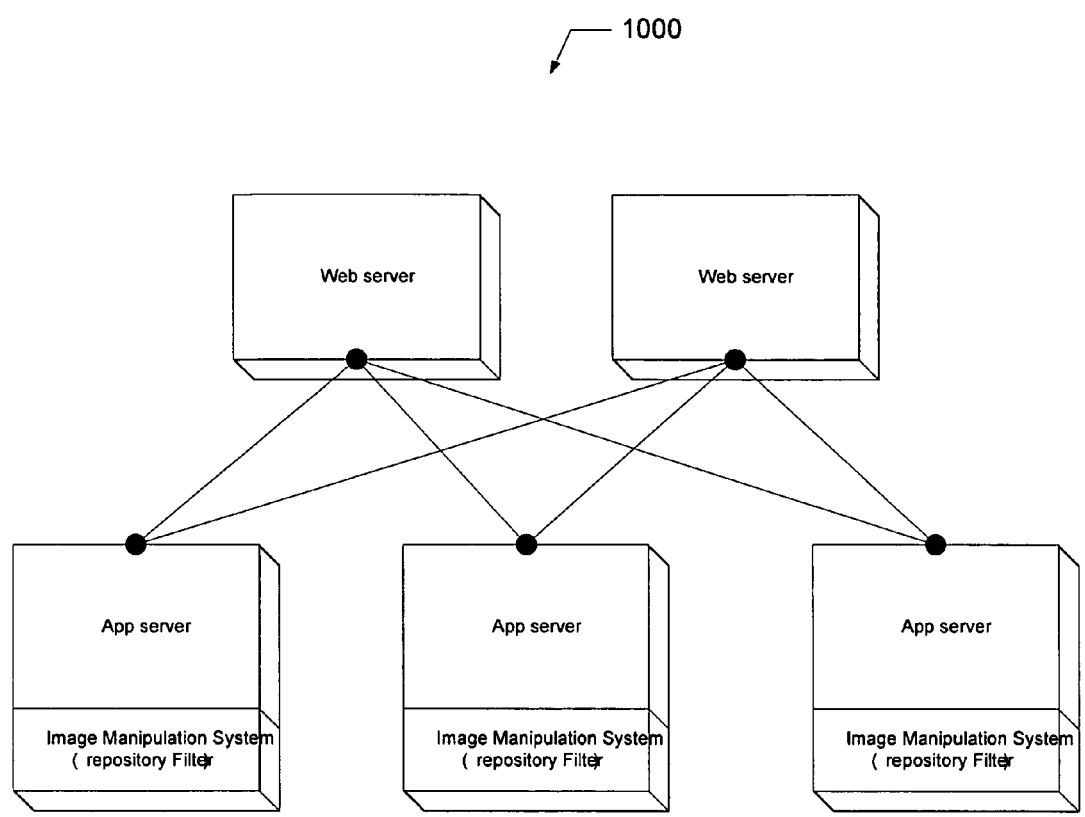
FIG. 10 illustrates one implementation of configuring image manipulation systems to utilize maximum distributed CPU cycles for each application server.

FIG. 10 illustrates one implementation 1000 of configuring image manipulation systems to utilize maximum distributed CPU cycles for each application server. In this implementation, an image manipulation system resides in each application server, each of which is linked to all Web servers.

Figure 11:
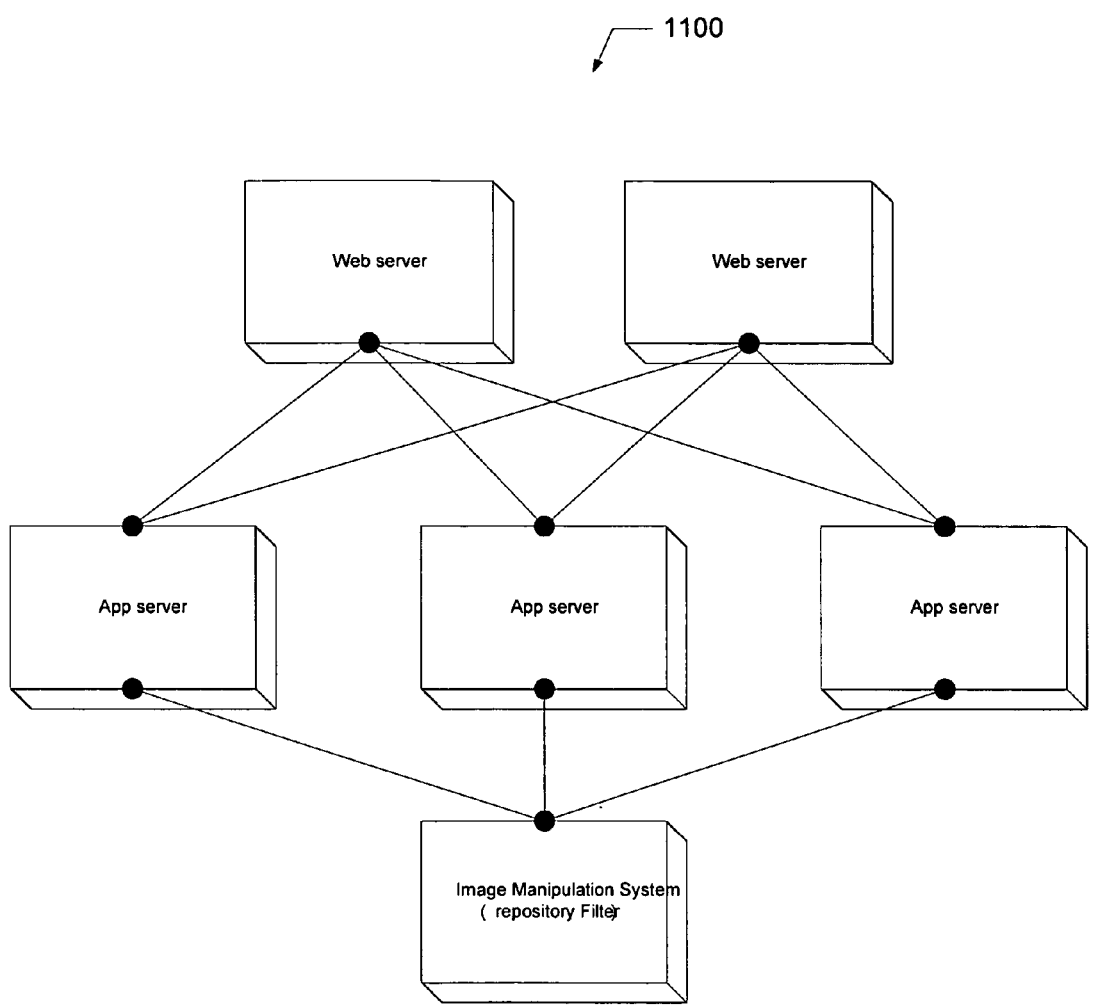
FIG. 11 illustrates another implementation of configuring image manipulation systems to utilize maximum distributed CPU cycles for each application server.

FIG. 11 illustrates another implementation 1100 of configuring image manipulation systems to utilize maximum distributed CPU cycles for each application server. In this implementation, one image manipulation system links to all application servers, each of which is linked to all Web servers.

In some implementations of the Rich Media Publishing environment 100, the RMP server system 105 may present users with a wealth of options and choices for learning, editing and enhancing, and sharing their media. The information architecture designed to facilitate ease of navigation to these various features incorporates several techniques, including the ability for users to search the site.

To facilitate the navigation, a Perl-based search engine could be set up to either have direct database access or to crawl the finished site pages. Further, the finished pages could be indexed, which would allow separation of processing time and the ability to optimize the queried information. The Perl-based search engine also provides regular expression handling and string parsing. By integrating the Perl-based search engine with user behavior profiles, a substantially optimal search tool can be implemented.

Figure 12:
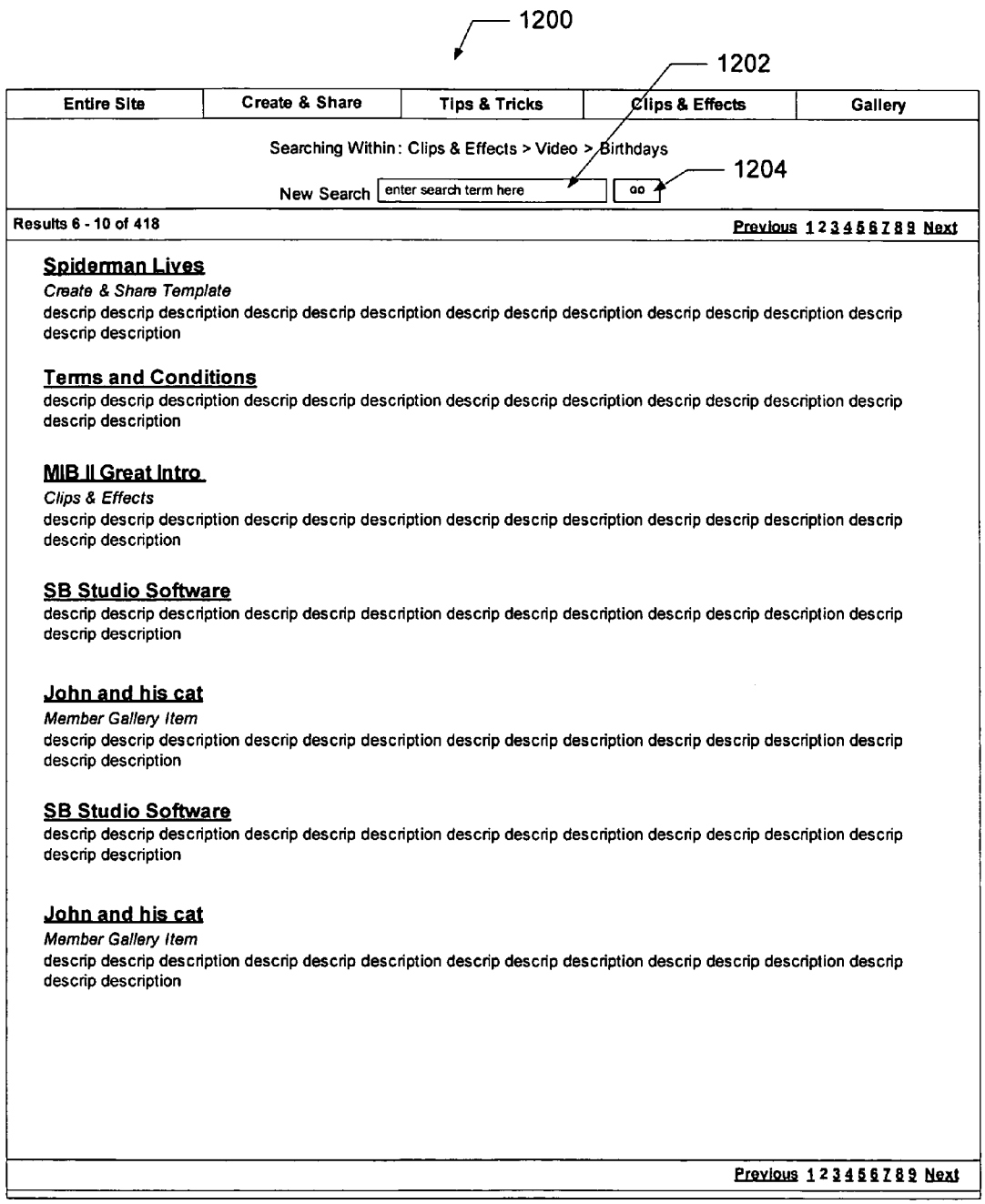
FIG. 12 shows a search engine implemented in accordance with above-described features.

FIG. 12 shows a search engine 1200 implemented in accordance with above-described features. Within any page of the search engine 1200, there is a search textbox 1202 allowing entry of keywords and a "go" button 1204 that performs a search across the entire site. The site for this usage is considered to be composed of all page items in the Create & Share, Tips & Tricks, Clips & Effects, Gallery, and Software taxonomies, as well any additional site pages such as Privacy Policy and Terms of Service. Within certain pages, a second search textbox and "go" button performs a search of the content at the specified taxonomy level and other lower levels.

In the illustrated implementation, the result display provides the display of the current area within which the search was performed, the ability for the user to search for new keywords within that same taxonomy, and the ability to switch between top-level categories. Switching between top-level categories performs the search with the specified keywords at that category level, providing new results. Each element in the result provides the name and the link. If the page is part of a taxonomy section, that information will be displayed. If the page contains a description, that description is displayed. Otherwise, the beginning of the body section is tapped.

The search engine 1200 uses a combination of meta tags and body content to index pages for searching. Each page that is to be indexed and made available for searching uses the following meta tags to improve the validity of search results. Further, pages that are to be considered part of a certain taxonomy category uses the taxonomy tag to indicate the place of the pages in the taxonomy.

| NAME | DESCRIPTION |
| --- | --- |
| description | Used to describe the contents of the page and what it offers; may be displayed verbatim to the user as part of a returned search element.<br>Example:<br><META name="description" content="The Homepage for the Sony Pictures Entertainment Network - your ultimate online destination for SPE film and television properties, home video & DVD content, the Game Show Network, and gateway to other Sony sites"> |
| keywords | Used to provide a condensed representation and categorization of the item's content. This list may include words that do not appear on the page, but are related to the intent and usefulness of the content.<br>Example:<br><META name="keywords" content="sony, entertainment, film, television, tv, sony pictures, spe homepage, columbia, movies, film, television, entertainment, dawsons, dawson's creek, party of five, entertainment, seinfeld, the nanny, married with children, godzilla, men in black, dvd, video, tickets, showtimes, games, store, teens, daytime, soaps, action, drama, comedy, game shows, win, free, prizes, sweepstakes, trips, free stuff, merchandise, entertainment, chance, enter, cool, travel, contests, clip vault, chat, headlines, posters, cd, memorabilia, entertainment, channels"> |
| author | The entity responsible for the page content.<br>Example:<br><META name="author" content="Screenblast"> |
| taxonomy | Contains the location in the Screenblast taxonomy for the item represented by this URI. Taxonomy information is represented as UNIX-style paths. Any page with this tag must contain items of, and only of, the taxonomy given. If items from more than one taxonomy category are present, the page should not be indexed. This tag is required of all page elements that are to be part of a taxonomy level.<br>Example:<br><META name="taxonomy" content="/Clips & Effects"> |
| robots | Used to tell well-behaved indexing crawlers whether or not this page is to be indexed. The four valid values are: follow, nofollow, index, noindex. Follow means that the crawlers may follow links found on the page to continue their indexing, while nofollow should stop the crawler at this leaf. Index means that the crawler is allowed to scan the page and allow search access, while noindex prohibits search of this page.<br>Robots in general tend to default to follow, index unless explicitly told otherwise.<br>Example:<br><META name="robots" content="follow,noindex"> to allow links to be followed, but this page is not returned in search queries. |
| premium | Used to identify the page element as containing information that is not available to common users. At this time, use is limited to considering a defined value as indicative of premium content. It is strongly recommended that the value true be the only value used at this time to indicate premium status. At a future time, other values may be introduced to further differentiate the site's offerings.<br>Example:<br><META name="premium" content="true"> to mark this page as being premium content. |

In some implementations of the Rich Media Publishing environment 100, it is desirable for the web services 110 in the RMP server system 105 to identify the user system 125 in relation to certain parameters, such as a referring URL and plan registrations. For example, the web services 110 can tailor services differently for users referred to the system 105 from different URLs. To facilitate various customized services, the support applications for the RMP server system 105 are implemented as described below.

Figure 13:
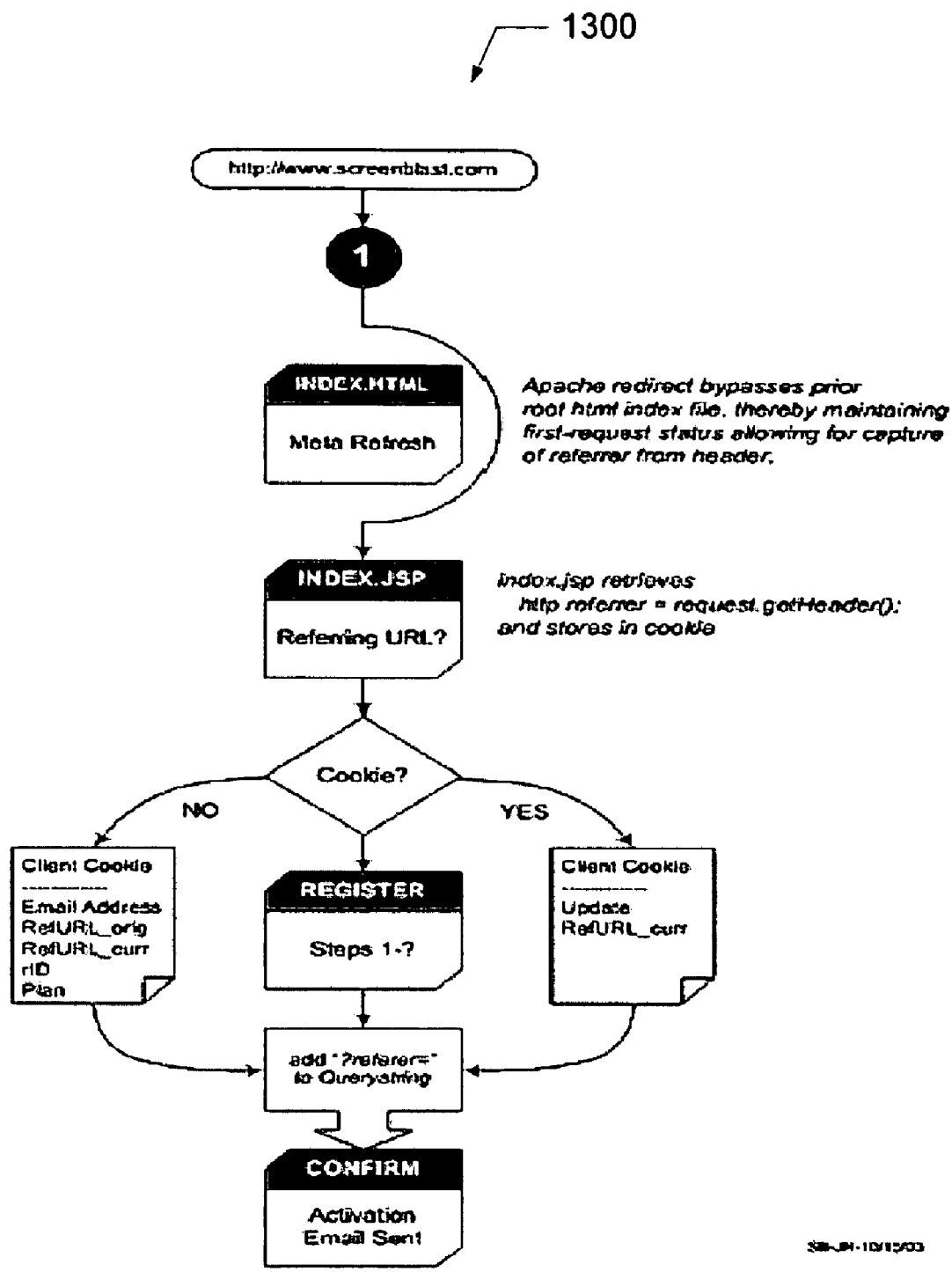
FIG. 13 shows a flow diagram of one implementation of identifying a type of user using referring URLs.

FIG. 13 shows a flow diagram 1300 of one implementation of identifying a type of user using referring URLs. This implementation is referred to as "Dynamic Custom Landing" because the main landing/home page is dynamically customized according to the referring URL. In the illustrated implementation, the referring URLs are stored in a cookie variable so that it can be retrieved during the confirmation of the registration. For example, upon entry into the RMP server system 105 (e.g., the Screenblast Web site), a variable containing a referring URL can be appended to the request string for a 1×1 pixel gif that is loaded on the landing/home page (primary entryway of the site). This allows the system 105 to connect the referral URL to a click stream.

In addition to passing the referring URL into the query string associated with an image request on the landing page (capturing Referring URL for that session), the server system 105 also adds a distinction between Original and Current Session referrals. Thus, this allows for the recording and/or reporting of whether the referring URL contributed to user awareness only or was responsible for conversion of that awareness.

As described above, there is a need in the RMP environment for an audio transcoding system (ATS) and an image manipulation system (IMS). However, there is also a need for a media conversion system (MCS) in which text, video, graphics, and audio can be dynamically combined to produce a project. Thus, the MCS combines the architecture of the ATS and the IMS.

Figure 14:
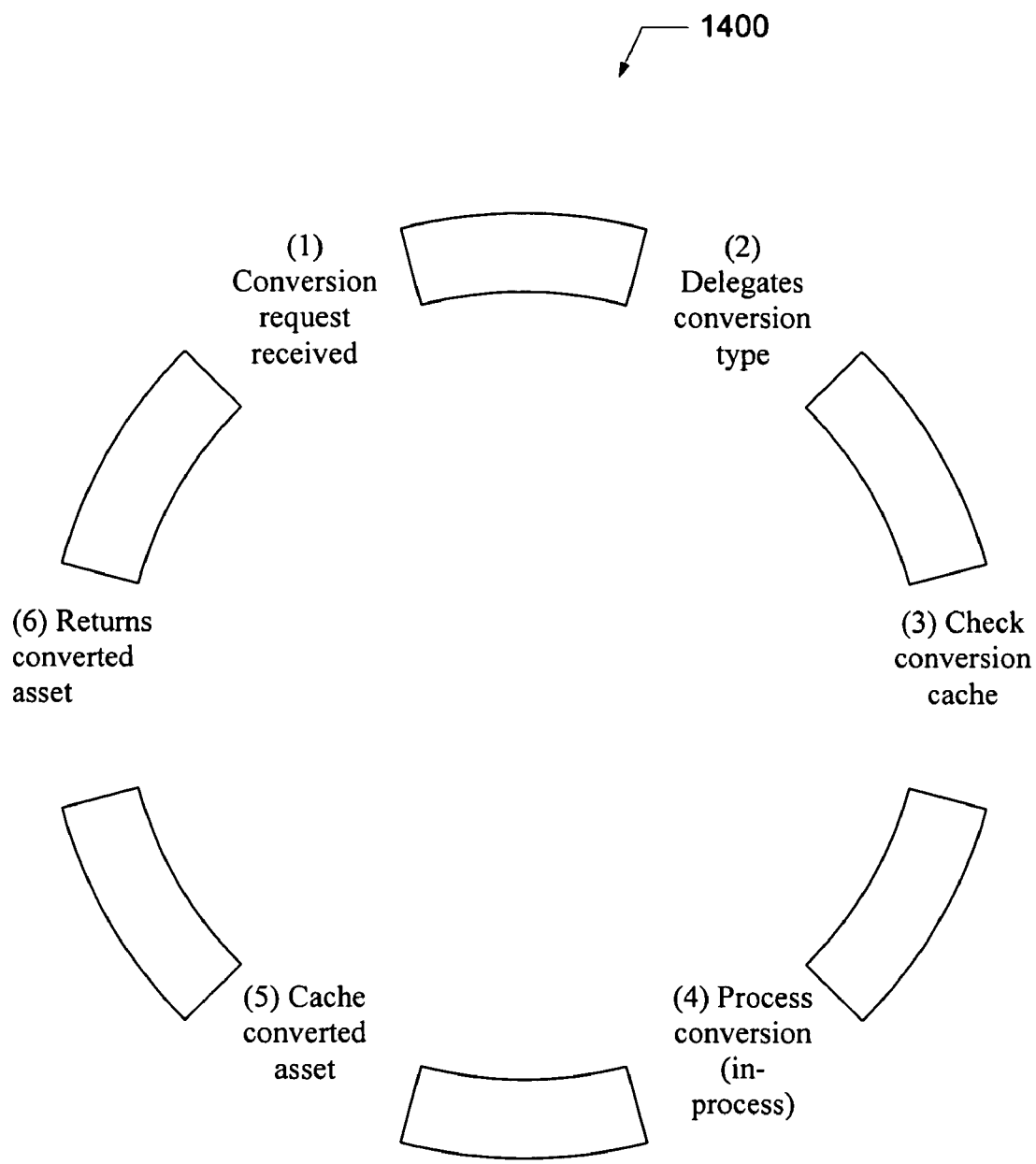
FIG. 14 illustrates an operations flow diagram for a media conversion system, which is configured as a repository filter.

FIG. 14 illustrates an operations flow diagram for a media conversion system 1400, which is configured as a repository filter. The diagram can be applied to MP3 conversion as an example. Thus, in the example diagram, the Flash-enabled media player signals, at (1), to the IMS conversion servers that the player needs to convert the asset. At (2), the IMS conversion server examines the request and determines whether the conversion should be delegated toward image resizing or MP3 conversion. If the request is determined to be an MP3 conversion, the IMS checks the cache table in the database, at (3), to see whether this MP3 has already been converted. If the MP3 has already been converted, then the operation is directed to (6). Otherwise, the IMS server performs the MP3 conversion, at (4). After a successful conversion, the IMS server stores, at (5), meta-information regarding the converted MP3 asset in the cache table of the database. The IMS server then returns the converted MP3 asset, at (6).

The various implementations of the invention are realized in electronic hardware, computer software, or combinations of these technologies. Most implementations include one or more computer programs executed by a programmable computer. For example, referring to FIG. 1, in one implementation, the server system includes one or more computers executing software implementing the RMP environment. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description describes computers connecting to servers through the Internet, additional variations and combinations are possible. For example, in other implementations, different types of network-enabled devices can be used, such as a network-enabled television or phone. Accordingly, the present invention is not limited to only those implementations described above.

What is claimed is:

1. A repository system for media publishing, comprising:
a plurality of storage devices configured to store a plurality of media items, the plurality of storage devices including a first storage device and a second storage device,
the first storage device configured to store a first type of media items, and
the second storage device configured to store a second type of media items; and
wherein the first type of media items is defined by a series of publishing variable including:
a format, a bit rate, a communication protocol, physical medium digital rights management information associated with media items, and an encoding type and compression technique used to reduce the physical size of the media items; and
wherein the second type of media items is defined by the same series of publishing variables with at least one of the publishing variables having a different value from that of the first type of media items; and
metadata information relating to the plurality of media items stored in said plurality of storage devices,
wherein said metadata information enables hierarchical organization of the plurality of media items so that the media items are easily accessed, moved, added, and deleted.

2. The system of claim 1, wherein said plurality of storage devices is distributed over a network to configure the repository system as an online repository system.

3. The system of claim 2, wherein the online repository system is configured as a Web-based Distributed Authoring and Versioning (WebDAV) facility.

4. The system of claim 2, further comprising:
a communication servlet to allow management of media items stored in said plurality of storage devices using WebDAV-issued commands.

5. The system of claim 4, wherein the WebDAV-issued commands includes HTTP requests.

6. The system of claim 2, further comprising:
a plurality of repository filter services configured to provide a framework for performing operations on the plurality of media items while uploading and downloading the media items from the network.

7. The system of claim 6, further comprising:
a plurality of templates, each template specifying a particular format for the different type of media item.

8. The system of claim 7, wherein said plurality of repository filter services includes a transcoder operating to perform one or more operations on a media item to convert the media item from an original format to a format closer to or matching the particular format specified by the template.

9. The system of claim 6, wherein said plurality of repository filter services includes a media manipulation system to change a media item from one type to another type.

10. The system of claim 9, wherein said media manipulation system includes an image manipulation system configured to resize an image of the media item.

11. The system of claim 1, wherein said first type of media items is an image type of a JPEG format.

12. The system of claim 11, wherein said second type of media items includes a music type of an MP3 format.

13. The system of claim 11, wherein said second type of media items includes a streaming media type of a WAV format.

14. The system of claim 1, further comprising:
an asset table to encapsulate relationship between files and folders in said repository system.

15. A method of providing storage for media items in media publishing, comprising:
storing a first type of media items in a first storage device;
storing a second type of media items in a second storage device,
wherein the first type of media items is defined by a series of publishing variable including:

a format, a bit rate, a communication protocol, physical medium digital rights management information associated with media items, and an encoding type and compression technique used to reduce the physical size of the media items; and wherein the second type of media items is defined by the same series of publishing variables with at least one of the publishing variables having a different value from that of the first type of media items; and relating first metadata information to the first type of media items; and relating second metadata information to the second type of media items, wherein said first and second metadata information enable hierarchical organization of the media items so that the media items are easily accessed, moved, added, and deleted.

16. The method of claim 15, further comprising: configuring the first and second storage devices to be distributed over a network.

17. The method of claim 16, wherein the distributed first and second storage devices are configured as a Web-based Distributed Authoring and Versioning (WebDAV) facility.

18. The method of claim 17, further comprising:
managing media items stored in the distributed first and second storage devices using WebDAV-issued commands.

19. The method of claim 18, wherein the WebDAV-issued commands includes HTTP requests.

20. The method of claim 16, further comprising:
providing a framework for performing operations on retrieved media items while uploading and downloading media items from the network.

21. The method of claim 20, further comprising:
specifying a particular format for the media items.

22. The method of claim 21, wherein the frame work for performing operations on retrieved media items includes performing one or more transcoding operations on a media item to convert the media item from its original format to a format closer to or matching the particular format.

23. The method of claim 21, wherein the frame work for performing operations on retrieved media items includes changing the media item from one type to another type.

24. The method of claim 15, further comprising:
configuring the first and second storage devices into a virtual folder to enable storage of media items and metadata information independent of physical locations.

25. The method of claim 24, further comprising:
presenting the first and second types of media items according the virtual folder to store the first and second types of media items independent of the first and second storage devices.

26. The method of claim 15, further comprising:
configuring the first and second storage devices into a plurality of virtual folders to enable storage of media items and metadata information independent of physical locations.

27. The method of claim 26, wherein configuring the first and second storage devices into a plurality of virtual folders includes enabling each user to have a different view of the stored media items than other users.

28. The method of claim 26, wherein configuring the first and second storage devices into a plurality of virtual folders includes customizing features of a presentation including the media items.

29. A computer program, stored in a tangible storage medium, for use in providing storage for media items in media publishing, the program comprising executable instructions that cause a computer to:
store a first type of media items in a first storage device;
store a second type of media items in a second storage device;
wherein the first type of media items is defined by a series of publishing variable including:
a format, a bit rate, a communication protocol, digital rights management information associated with media items, and an encoding type and compression technique used to reduce the physical size of the media items; and
wherein the second type of media items is defined by the same series of publishing variables with at least one of the publishing variables having a different value from that of the first type of media items; and
relate first metadata information to the first type of media items; and
relate second metadata information to the second type of media items, wherein said first and second metadata information enable hierarchical organization of the media items so that the media items are easily accessed, moved, added, and deleted.

30. A repository system for media publishing, comprising:
a plurality of storage means for storing a plurality of media items, the plurality of storage means including a first storage means and a second storage means,
the first storage means configured to store a first type of media items, and
the second storage means configured to store a second type of media items; and
wherein the first type of media items is defined by a series of publishing variable including:
a format, a bit rate, a communication protocol, physical medium digital rights management information associated with media items, and an encoding type and compression technique used to reduce the physical size of the media items; and
wherein the second type of media items is defined by the same series and publishing variables with at least one of the publishing variables having a different value from that of the first type of media items; and
means for relating metadata information to the plurality of media items stored in said plurality of storage means, wherein relating metadata information enables hierarchical organization of the plurality of media items so that the media items are easily accessed, moved, added, and deleted.

31. A storage system for media publishing, comprising:
means for storing a first type of media items;
means for storing a second type of media items,
wherein the first type of media items is defined by a series of publishing variable including:
a format, a bit rate, a communication protocol, physical medium digital rights management information associated with media items, and an encoding type and compression technique used to reduce the physical size of the media items; and
wherein the second type of media items is defined by the same series of publishing variables with at least one of the publishing variables having a different value from that of the first type of media items; and
means for relating first metadata information to the first type of media items; and
means for relating second metadata information to the second type of media items, wherein said first and second metadata information enable hierarchical organization of the media items so that the media items are easily accessed, moved, added, and deleted.

* * * * *